United States Patent
Meyer, Jr.

(10) Patent No.: US 6,259,572 B1
(45) Date of Patent: *Jul. 10, 2001

(54) PHOTOGRAPHIC COLOR EFFECTS LIGHTING FILTER SYSTEM

(75) Inventor: James E. Meyer, Jr., Los Angeles, CA (US)

(73) Assignee: Rosco Laboratories, Inc., Port Chester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/604,340

(22) Filed: Feb. 21, 1996

(51) Int. Cl.[7] .............................. G02B 5/22; G03B 15/02
(52) U.S. Cl. ............................ 359/885; 359/890; 362/3; 362/16; 362/17; 362/18; 362/293; 396/4
(58) Field of Search ............................. 359/885–891; 396/275, 276, 4; 362/293, 3, 16, 17, 18

(56) References Cited

U.S. PATENT DOCUMENTS

| | | |
|---|---|---|
| 2,244,992 | 6/1941 | Guerrero . |
| 2,326,007 | 8/1943 | Capstaff . |
| 2,809,552 | 10/1957 | Ciavola . |
| 3,299,773 | 1/1967 | Jasny . |
| 3,443,868 | 5/1969 | Mitchell . |
| 4,041,308 | 8/1977 | Fujita . |
| 4,900,131 | 2/1990 | Bahnemann et al. . |
| 4,918,470 | 4/1990 | Whiteside . |
| 5,126,886 * | 6/1992 | Richardson et al. ................. 359/888 |
| 5,172,146 | 12/1992 | Wooldridge . |
| 5,515,119 * | 5/1996 | Murdock et al. ...................... 362/18 |

FOREIGN PATENT DOCUMENTS

| | | |
|---|---|---|
| 741508 | 11/1943 | (AT) . |
| 1173619 | 11/1967 | (GB) . |
| 6222210 | 8/1994 | (JP) . |

* cited by examiner

Primary Examiner—Cassandra Spyrou
Assistant Examiner—Audrey Chang
(74) Attorney, Agent, or Firm—Shapiro, Borenstein & Dupont LLP

(57) ABSTRACT

A photographic color effects lighting filter system made up of a series of lighting filters which are designed to be placed in front of one or more lighting sources. The lighting color effects filter series is made up of groups of filters wherein each of the filter groups is composed of a plurality of filters wherein each filter within a given group provides selective absorption of light having a color corresponding to one of the primary, secondary or intermediary colors. Each of the filters within a given group has a specific effective absorption density. The effective absorption densities are calibrated so that the selected absorption densities are the same for each of the different color groups.

12 Claims, 25 Drawing Sheets

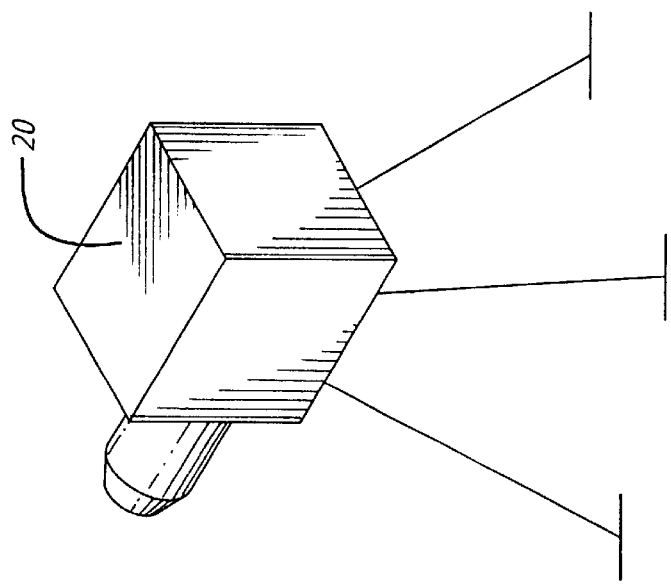
FIG. 1
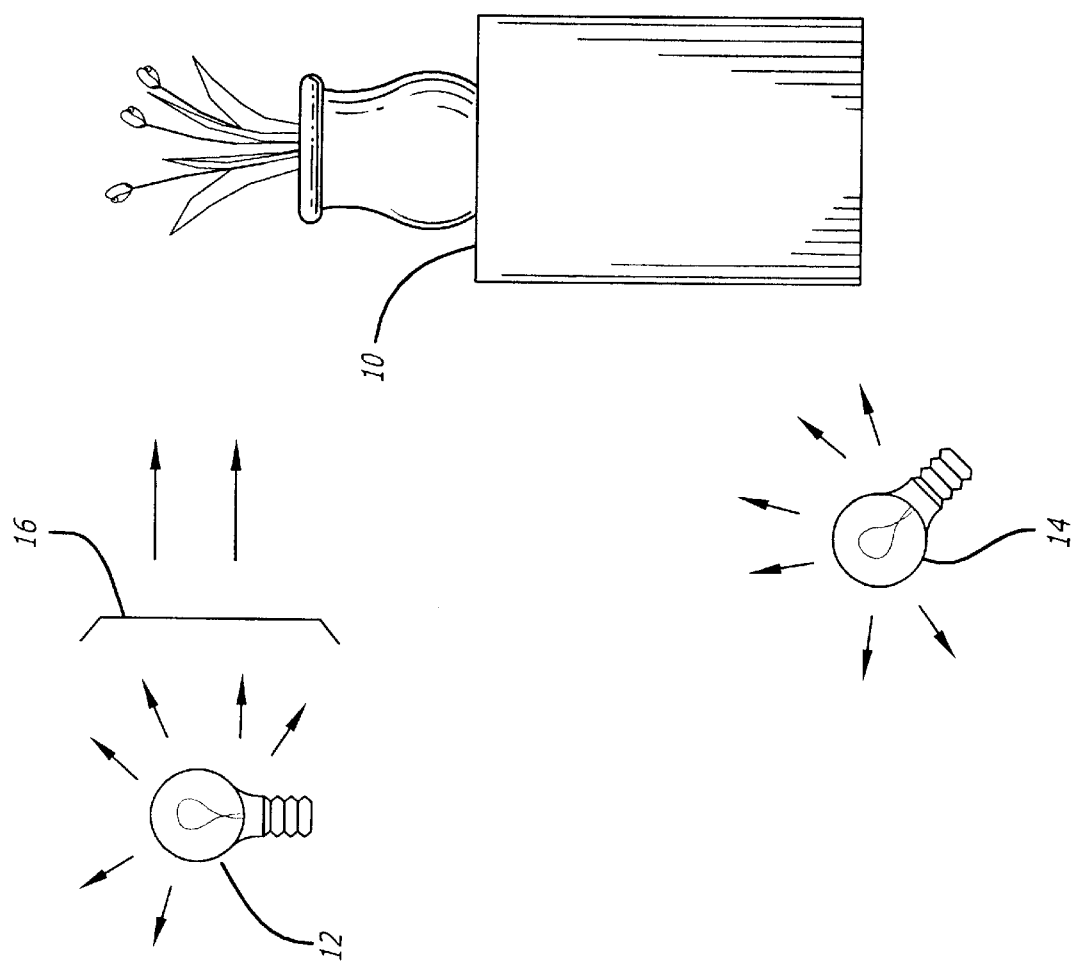

90 Green

LOG D EXPOSURE LOSS

|  | Actual | Effective |
|---|---|---|
| BLUE | -1.32 | -0.89 |
| GREEN | -0.43 | 0.00 |
| RED | -1.34 | -0.91 |

Log Density Exposure Loss

Transmittance @ Wavelength

| CC FILTRATION VALUES | BLUE | 0.00 |
|---|---|---|
|  | GREEN | 90.00 |
|  | RED | 0.00 |

60 Green

LOG D EXPOSURE LOSS

|  | Actual | Effective |
|---|---|---|
| BLUE | -0.87 | -0.60 |
| GREEN | -0.27 | 0.00 |
| RED | -0.86 | -0.59 |

Log Density Exposure Loss

Transmittance @ Wavelength

| CC FILTRATION VALUES | BLUE | 0.00 |
|---|---|---|
|  | GREEN | 59.17 |
|  | RED | 0.00 |

30 Red

LOG D EXPOSURE LOSS

| | Actual | Effective |
|---|---|---|
| BLUE | -0.39 | -0.30 |
| GREEN | -0.39 | -0.30 |
| RED | -0.09 | 0.00 |

Log Density Exposure Loss

Transmittance @ Wavelength

| CC FILTRATION VALUES | BLUE | 0.00 |
|---|---|---|
| | GREEN | 0.00 |
| | RED | 30.25 |

15 Red

LOG D EXPOSURE LOSS

| | Actual | Effective |
|---|---|---|
| BLUE | -0.23 | -0.15 |
| GREEN | -0.23 | -0.15 |
| RED | -0.08 | 0.00 |

Log Density Exposure Loss

Transmittance @ Wavelength

| CC FILTRATION VALUES | BLUE | 0.00 |
|---|---|---|
| | GREEN | 0.00 |
| | RED | 15.28 |

90 Magenta-Blue

LOG D EXPOSURE LOSS

|  | Actual | Effective |
|---|---|---|
| BLUE | -0.35 | 0.00 |
| GREEN | -1.26 | -0.91 |
| RED | -0.81 | -0.46 |

Log Density Exposure Loss

Transmittance @ Wavelength

| CC FILTRATION VALUES | CYAN | 46.00 |
|---|---|---|
|  | YELLOW | 0.00 |
|  | MAGENTA | 91.00 |

60 Magenta-Blue

LOG D EXPOSURE LOSS

|  | Actual | Effective |
|---|---|---|
| BLUE | -0.25 | 0.00 |
| GREEN | -0.85 | -0.60 |
| RED | -0.56 | -0.31 |

Log Density Exposure Loss

Transmittance @ Wavelength

| CC FILTRATION VALUES | CYAN | 31.00 |
|---|---|---|
|  | YELLOW | 0.00 |
|  | MAGENTA | 60.00 |

30 Cyan-Blue

LOG D EXPOSURE LOSS

|  | Actual | Effective |
|---|---|---|
| BLUE | -0.23 | 0.00 |
| GREEN | -0.39 | -0.16 |
| RED | -0.53 | -0.30 |

Log Density Exposure Loss

Transmittance @ Wavelength

| CC FILTRATION VALUES | CYAN | 30.00 |
|---|---|---|
| | YELLOW | 0.00 |
| | MAGENTA | 16.00 |

15 Cyan-Blue

LOG D EXPOSURE LOSS

|  | Actual | Effective |
|---|---|---|
| BLUE | -0.17 | 0.00 |
| GREEN | -0.24 | -0.07 |
| RED | -0.32 | -0.15 |

Log Density Exposure Loss

Transmittance @ Wavelength

| CC FILTRATION VALUES | CYAN | 15.00 |
|---|---|---|
| | YELLOW | 0.00 |
| | MAGENTA | 7.00 |

90 Cyan-Blue

LOG D EXPOSURE LOSS

|  | Actual | Effective |
|---|---|---|
| BLUE | -0.36 | 0.00 |
| GREEN | -0.81 | -0.44 |
| RED | -1.27 | -0.91 |

Log Density Exposure Loss

Transmission @ Wavelength

| CC FILTRATION VALUES | CYAN | 91.00 |
|---|---|---|
|  | YELLOW | 0.00 |
|  | MAGENTA | 44.00 |

60 Cyan-Blue

LOG D EXPOSURE LOSS

|  | Actual | Effective |
|---|---|---|
| BLUE | -0.30 | 0.00 |
| GREEN | -0.59 | -0.29 |
| RED | -0.91 | -0.61 |

Log Density Exposure Loss

Transmittance @ Wavelength

| CC FILTRATION VALUES | CYAN | 61.00 |
|---|---|---|
|  | YELLOW | 0.00 |
|  | MAGENTA | 29.00 |

30 Yellow-Green

LOG D EXPOSURE LOSS

|  | Actual | Effective |
|---|---|---|
| BLUE | -0.47 | -0.30 |
| GREEN | -0.17 | 0.00 |
| RED | -0.37 | -0.20 |

Log Density Exposure Loss

Transmittance @ Wavelength

| CC FILTRATION VALUES | CYAN | 20.00 |
|---|---|---|
|  | YELLOW | 30.00 |
|  | MAGENTA | 0.00 |

15 Yellow-Green

LOG D EXPOSURE LOSS

|  | Actual | Effective |
|---|---|---|
| BLUE | -0.26 | -0.16 |
| GREEN | -0.10 | 0.00 |
| RED | -0.18 | -0.08 |

Log Density Exposure Loss

Transmittance @ Wavelength

| CC FILTRATION VALUES | CYAN | 8.00 |
|---|---|---|
|  | YELLOW | 16.00 |
|  | MAGENTA | 0.00 |

90 Yellow-Red

LOG D EXPOSURE LOSS

|  | Actual | Effective |
|---|---|---|
| BLUE | -0.98 | -0.89 |
| GREEN | -0.53 | -0.44 |
| RED | -0.09 | 0.00 |

Log Density Exposure Loss

Transmittance @ Wavelength

| CC FILTRATION VALUES | CYAN | 0.00 |
|---|---|---|
|  | YELLOW | 89.00 |
|  | MAGENTA | 44.00 |

60 Yellow-Red

LOG D EXPOSURE LOSS

|  | Actual | Effective |
|---|---|---|
| BLUE | -0.65 | -0.57 |
| GREEN | -0.39 | -0.31 |
| RED | -0.08 | 0.00 |

Log Density Exposure Loss

Transmittance @ Wavelength

| CC FILTRATION VALUES | CYAN | 0.00 |
|---|---|---|
|  | YELLOW | 57.00 |
|  | MAGENTA | 31.00 |

PHOTOGRAPHIC COLOR EFFECTS LIGHTING FILTER SYSTEM

BACKGROUND OF THE INVENTION

1. Field of the Invention

The present invention relates generally to lighting systems which are used in photographic applications, such as the filming of motion pictures. More particularly, the present invention relates to color effects lighting filters and filtering systems which are used to modify and control the quality and character of the light that is presented to the camera and film emulsion.

2. Description of Related Art

It is well-known that lighting plays an important role in still photography and in the filming of motion picture scenes. Much time is spent in selecting the type of light(s) and in controlling the lighting color temperature, intensity and quality in order to achieve desired images on film. The selection and control of lighting has been, and continues to be, a complex art. Although there are guidelines which can be used to generally predict what image will be recorded on a given film for different lighting conditions, the complex interaction of light from numerous sources in a scene can produce final color images on film which are often times unexpected and undesirable. As a result, even the most skilled cameraman or lighting technician must rely on lighting meters, trial and error testing, and a great deal of experience to achieve a lighting environment which produces desired film images.

Using colored filters to control the intensity and color of light which reaches the photographic film in the motion picture camera has been traditionally divided into two basic disciplines. The first involves filtering light in the image-forming optical path. This type of filter is typically referred to as a "lens filter." Lens filters are placed either directly before or directly behind the lens. They provide the cameraman or color lab technician with the means of accurately controlling the color and intensity of light presented to the film emulsion. A common type of colored lens filter is the color conversion filter. Color conversion filters convert the color quality of a light source so that it matches the color response for which the film has been designed. For example, if tungsten or incandescent light is used with a daylight-balanced film, a blue filter is placed before the lens. Likewise, if daylight illumination is used with tungsten-balanced film, an amber filter is recommended.

Other colored lens filters include light balancing filters, neutral density filters, color compensating filters, and special purpose filters. Light balancing filters perform the same function as color conversion filters except that finer discreet increments are used. For example, bluish filters are used to raise the light-source color temperature in degrees kelvin, while yellowish filters are used to decrease the light source color temperature. Neutral density filters are used to reduce the overall level of the light intensity. Color compensating filters differ from color conversion, light balancing and neutral density filters in that they are designed to specifically control the primary red, blue or green components of the spectrum. These color compensating filters are primarily used in the image-forming path to provide minor color correction or to adjust for minor variations in film balance due to manufacturing tolerances or conditions of use, such as storage, exposure, processing and the like.

Color compensating filters are commercially available in six colors—red, green, blue, cyan, magenta and yellow. Red, green and blue primary filters transmit their own primary component while absorbing portions of the other two primary components. Cyan, magenta and yellow secondary filters absorb portions of their respective red, green and blue complimentary component while transmitting the other two. Each color has increasing density values ranging from 0.025 to 0.50. These values refer to the effective density, as measured at the attenuated complimentary color(s), minus the density of its own transmitted color(s). As a result, for example, the density value for a yellow color compensating filter refers to the difference between the effective density of its attenuated blue transmission minus the averaged effective density of its green plus red (yellow producing) transmission.

The final principal type of colored lens filter is the special purpose filter. This type of lens filter typically includes filters for controlling the tonal rendering of colored objects for black and white photography, as well as filters used for very specific laboratory or industrial applications. As a group, colored special purpose filters are limited to an eclectic assortment of colors sharing little, if any, systematic relationship.

Although lens filters are well-suited for their intended purposes, a principal drawback of such filters is that they affect all of the light which enters the camera lens. This can be a problem, especially when filming motion picture scenes where there are multiple sources of light. For example, an interior scene filmed with tungsten-balanced film might be lit by both a tungsten light and daylight coming through a window. An amber lens filter could be used to convert the window-daylight to the tungsten balance of the film. However, the amber lens filter would render the interior tungsten light as distinctly orange. As is apparent, the potential for such color conflicts increases rapidly as the number and type of different light sources in a scene increases.

The second method for controlling the color and intensity of light reaching the film is to filter the light at its source. Such source filters are commonly referred to as "lighting filters". Exemplary lighting filters include color conversion filters, light balancing filters, neutral density filters, color compensating filters and color effects filters. The color conversion, light balancing and neutral density lighting filters are much the same as the color conversion, light balancing, and neutral density lens filters. They are used mainly to overcome the above-described problems associated with lens filters when multiple light sources of different color quality or intensity are present in a scene.

Color compensating filters for lighting are principally magenta and green types which have been limited to four densities (0.04, 0.075, 0.15, and 0.30). These filters were introduced in the early 1980's specifically for color-correcting fluorescent and industrial discharge lights. Color effects filters are generally the same types as have been used conventionally for theatrical and stage performance purposes. These types of filters, commonly called "party color gels," have been generally designed for aesthetic stage purposes without prior consideration being given to the technical requirements of recording images on photographic film.

SUMMARY OF THE INVENTION

In accordance with the present invention, a photographic color effects lighting filter system is provided which is made up of a series of filters which are designed to be placed in front of one or more lighting sources during the filming of motion pictures and other photographic applications. Each of the series of color effects lighting filters which makes up the system of the present invention includes a plurality of groups of filters wherein each of the filter groups includes a number of filters. Each of the filters in a given group is designed to provide selective wavelength absorption, based on their importance with respect to the spectral-sensitivity characteristics of photographic film emulsions. The groups of different color effects lighting filters include those which transmit photographically important colors, such as blue, green, red, yellow, magenta, cyan, cyan-blue, cyan-green, yellow-green, yellow-red, magenta-red and magenta-blue. As a feature of the present invention, each of the filter color groups has at least two filters which have different known absorption densities. The absorption densities for the various color groups are effectively the same to provide a calibrated approach to light source control. As a further feature of the present invention, the color filter groups are preferably provided in four specific absorption densities 0.15, 0.30, 0.60 and 0.90. These densities provide an effective reduction of ½, 1, 2 and 3 f-stops, respectively.

In one embodiment of the present invention, the color effects lighting filter system is provided as different series of specific color groups, each of which has the four effective absorption densities of 0.15, 0.30, 0.60 and 0.90. A first series includes the primary color filter class, and the secondary color filter class. The primary color filter class includes a blue filter group, a green filter group and a red filter group, whereas the secondary color filter class includes a yellow filter group, a magenta filter group and a cyan filter group. Each of these six groups includes four filters having the effective absorption densities set forth above.

As an additional feature of the present invention, a second series of filter groups covering the intermediary colors is provided. This second series provides for transmission of cyan-blue, cyan-green, yellow-green, yellow-red, magenta-red and magenta-blue. In a preferred embodiment, each of the intermediary color group filters includes the four effective maximum absorption densities of 0.15, 0.30, 0.60 and 0.90. The intermediary color filter system provides for accurate and predictable control of color hues in values which may be desired in addition to the color control provided by the primary and secondary color filters.

The photographic color effects lighting filters and system, in accordance with the present invention, are especially well-suited for use in filming motion pictures. The system provides a series of color effects lighting filters that are calibrated to provide predictable control of light which reaches the camera during filming. The photographic lighting filter system of the present invention eliminates much of the guess work and trial and error which has been traditionally associated with filtering of multiple light sources with "party color gels" for filmmaking.

The above discussed and many other features and attendant advantages of the present invention will become better understood by reference to the following detailed description when taken in conjunction with the accompanying drawings.

BRIEF DESCRIPTION OF THE DRAWINGS

FIG. 1 is a schematic representation of a preferred exemplary use of the photographic lighting filter system in accordance with the present invention during motion picture filming.

DETAILED DESCRIPTION OF THE INVENTION

Figure 2:
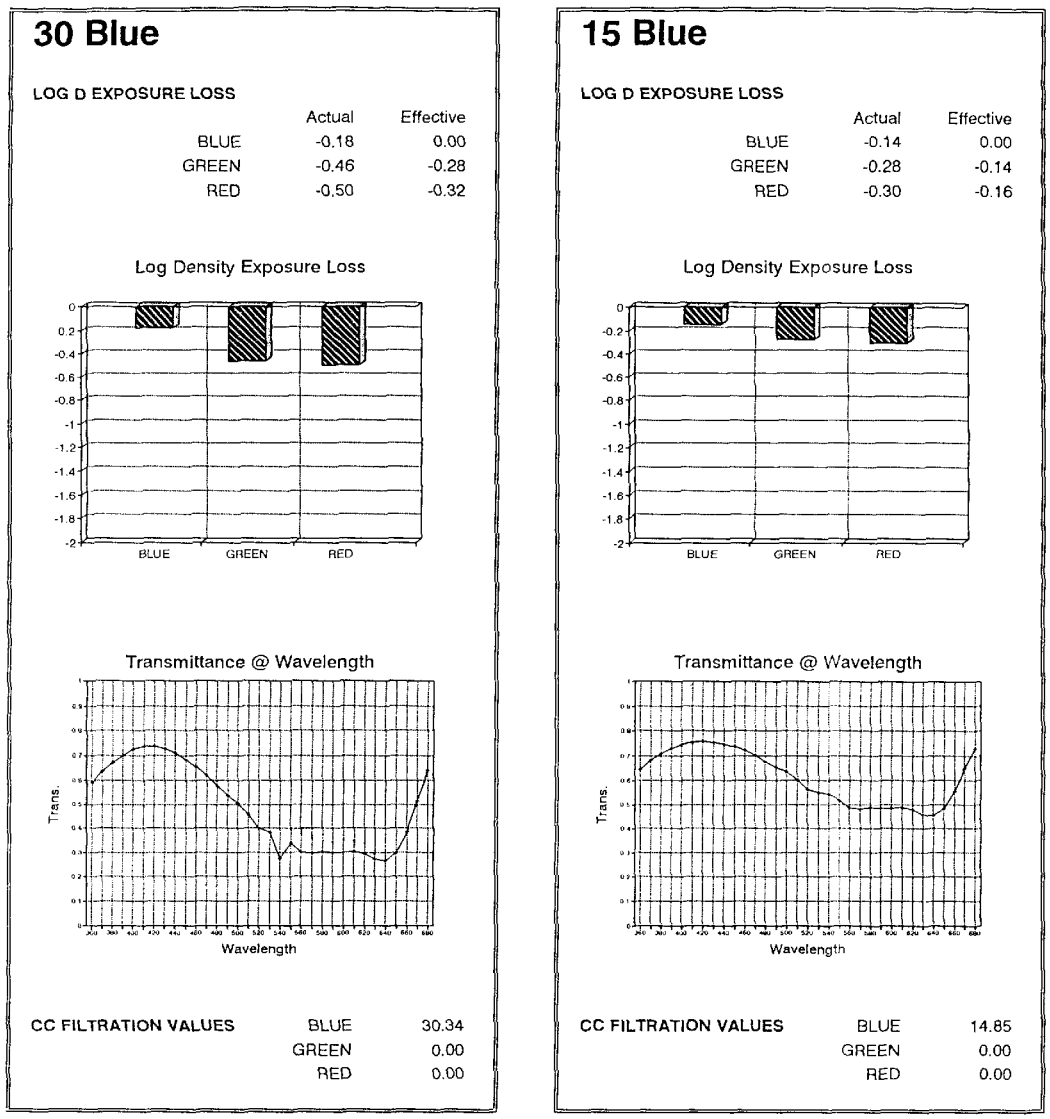
FIG. 2 is a graphic representation of the log density exposure loss and transmittance curves for the blue color group lighting filter in accordance with the present invention for effective absorption densities 0.15 (15 blue) and 0.30 (30 blue).

The photographic color effects lighting filter system of the present invention may be used whenever and wherever it is desired to alter and control the coloration of light sources used during photographic applications. The lighting filter system is particularly well-suited for use in situations where light from multiple sources are present. Although the invention may be used for controlling lighting in a wide variety of photographic settings, the invention is particularly well-suited for use in the filming of motion pictures. The following detailed description will focus on filter systems which are preferred for use in motion picture filming with it being understood that many of the teachings with respect to filming motion pictures are applicable to other photographic applications, including still photography.

The photographic color effects lighting filter system is made up of a series of lighting filters which are designed to be placed in front of various lighting sources, but here described for the tungsten-halogen type lamp commonly used in motion picture production. The schematic representation of how the lighting filters are used is set forth in FIG. 1. The object or scene being filmed is represented by box 10. Multiple lighting sources are provided by tungsten light 12 and tungsten light 14. Lighting filter 16 is placed in front of light source 12 to provide coloration to scene 10, while light source 14 is left unfiltered. A motion picture camera 20 containing tungsten-balanced emulsion is used to photograph scene 10 as illuminated by the filtered source 12 and the unfiltered source 14.

The use of a single color effects lighting filter is shown in FIG. 1. However, if desired, different or multiple color effects lighting filters may be placed in front of sources 12 and/or 14 in order to achieve the desired photographic lighting effect.

In accordance with the present invention, the color effects lighting filter 16 is selected from a series of color effects lighting filters. The color effects lighting filter series includes a plurality of groups of filters wherein each of the groups of filters includes a plurality of individual filters. Each of the filters in each of the groups is designed according to the blue, green and red spectral-sensitivity response of conventional photographic emulsions. They each thereby provide selective transmission of light in a specific and predictable color and value for the film emulsion. Preferred colors are the primary colors: blue, green and red. Also preferred are the secondary colors: yellow, magenta and cyan. In addition, the intermediary colors cyan-blue, cyan-green, yellow-green, yellow-red, magenta-red and magenta-blue are suitable for use in accordance with the present invention as a specific color group.

As a required feature of the present invention, the different color groups in the series of filters have calibrated absorption densities which correspond to each other. The calibration of the absorption densities provides the cameraman and lighting technician with the ability to select and use filter elements which will have a predictable effect on the lighting source coloration and resulting scene lighting as recorded by the film. Each series of lighting filters has at least two color groups and each color group includes filters having at least two different absorption densities. A preferred class of lighting filters in accordance with the present invention is set forth in Table 1. The class includes the three primary color groups blue, green and red. Within each color group, there are four filters having effective absorption densities of 0.15, 0.30, 0.60 and 0.90. This series of primary color filters is especially well-suited for use in filming motion pictures because the effective absorption densities produce attenuation of the absorbed colors in values of ½, 1, 2, and 3 f-stops. For example, the blue filter group is designed to produce maximum transmission of light for the blue sensitivity layer while providing equal attenuation of light to the film's green and red sensitivity layers by ½, 1, 2 or 3 f-stops.

TABLE 1

PRIMARY COLOR LIGHTING FILTERS

ABSORPTION DENSITIES

| | | | | |
|---|---|---|---|---|
| Blue | 0.15 | 0.30 | 0.60 | 0.90 |
| Green | 0.15 | 0.30 | 0.60 | 0.90 |
| Red | 0.15 | 0.30 | 0.60 | 0.90 |

The primary color group filter class set forth in Table 1 may be supplemented by a secondary color effects lighting filter class as set forth in Table 2. The secondary color effects lighting filters include yellow, magenta and cyan color groups having effective absorption transmission densities of 0.15, 0.30, 0.60 and 0.90. One or all of the secondary color groups may be included with the primary color group filters to provide a series of lighting filters which are especially well-suited for use in connection with controlling the coloration of scene lighting. For example, the yellow secondary filter produces equally maximum transmissions for the film's green and red sensitivity layers while providing attenuation of blue light to the film's blue sensitivity layer by ½, 1, 2 and 3 f-stops.

TABLE 2

SECONDARY COLOR LIGHTING FILTERS

TRANSMISSION DENSITIES

| | | | | |
|---|---|---|---|---|
| Yellow | 0.15 | 0.30 | 0.60 | 0.90 |
| Magenta | 0.15 | 0.30 | 0.60 | 0.90 |
| Cyan | 0.15 | 0.30 | 0.60 | 0.90 |

An additional preferred exemplary series of lighting filters in accordance with the present invention are identified in Table 3. This series includes six intermediary color effect groups. Each group includes filters designed according to the blue, green and red spectral-sensitivity response of conventional photographic emulsions. They are designed such that the color component of maximum effective absorption density equal 0.15, 0.30, 0.60 and 0.90, with a second color component having an effective absorption density that is 50% of that maximum value. For example, the cyan-blue intermediary filter produces maximum transmission of light for the film's blue sensitivity layer, while providing a 1:2 attenuation of light in the film's respective green and red sensitivity layers.

It should be noted that slight variation in the preferred absorption densities detailed above is acceptable. For example, the filters with absorption densities 0.15 and 0.30 could have variation ±0.03. Variation of ±0.05 would be acceptable for those filters having absorption densities of 0.60 and 0.90.

TABLE 3

INTERMEDIARY COLOR EFFECTS LIGHTING FILTERS

ABSORPTION DENSITIES

| | | | | |
|---|---|---|---|---|
| Cyan-Blue | 0.075/0.15 | 0.15/0.30 | 0.30/0.60 | 0.45/0.90 |
| Cyan-Green | 0.075/0.15 | 0.15/0.30 | 0.30/0.60 | 0.45/0.90 |
| Yellow-Red | 0.075/0.15 | 0.15/0.30 | 0.30/0.60 | 0.45/0.90 |
| Yellow-Green | 0.075/0.15 | 0.15/0.30 | 0.30/0.60 | 0.45/0.90 |
| Magenta-Red | 0.075/0.15 | 0.15/0.30 | 0.30/0.60 | 0.45/0.90 |
| Magenta-Blue | 0.075/0.15 | 0.15/0.30 | 0.30/0.60 | 0.45/0.90 |

The filters in each of the filter groups are made from conventional lighting filter material such as optical quality plastics or glass. Preferred plastic materials are polyester, polycarbonate, polyethylene naphthalate, acetate or acrylic. The filters may be any size or shape as may be required to provide filtering of a given light source. For example, plastic filter sheets which are sufficiently large to cover windows or other large light sources may be used. The thickness of the filter material may also be varied widely depending upon the concentration of dye, the type of material and the practicalities of usage.

Figure 3:
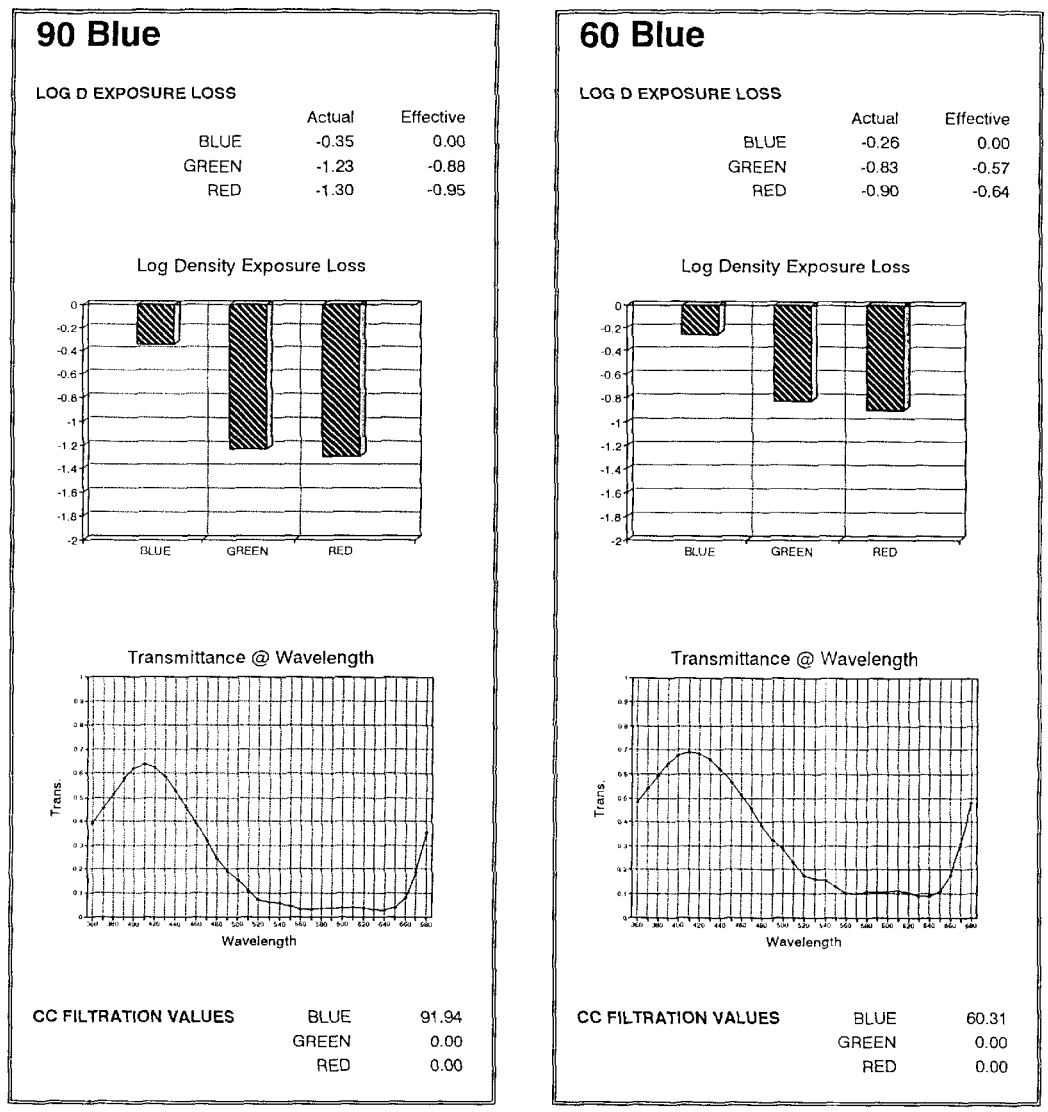
FIG. 3 is a graphic representation of the log density exposure loss and transmittance curves for the blue color group lighting filter in accordance with the present invention for effective absorption densities 0.60 (60 blue) and 0.90 (90 blue).
Figure 4:
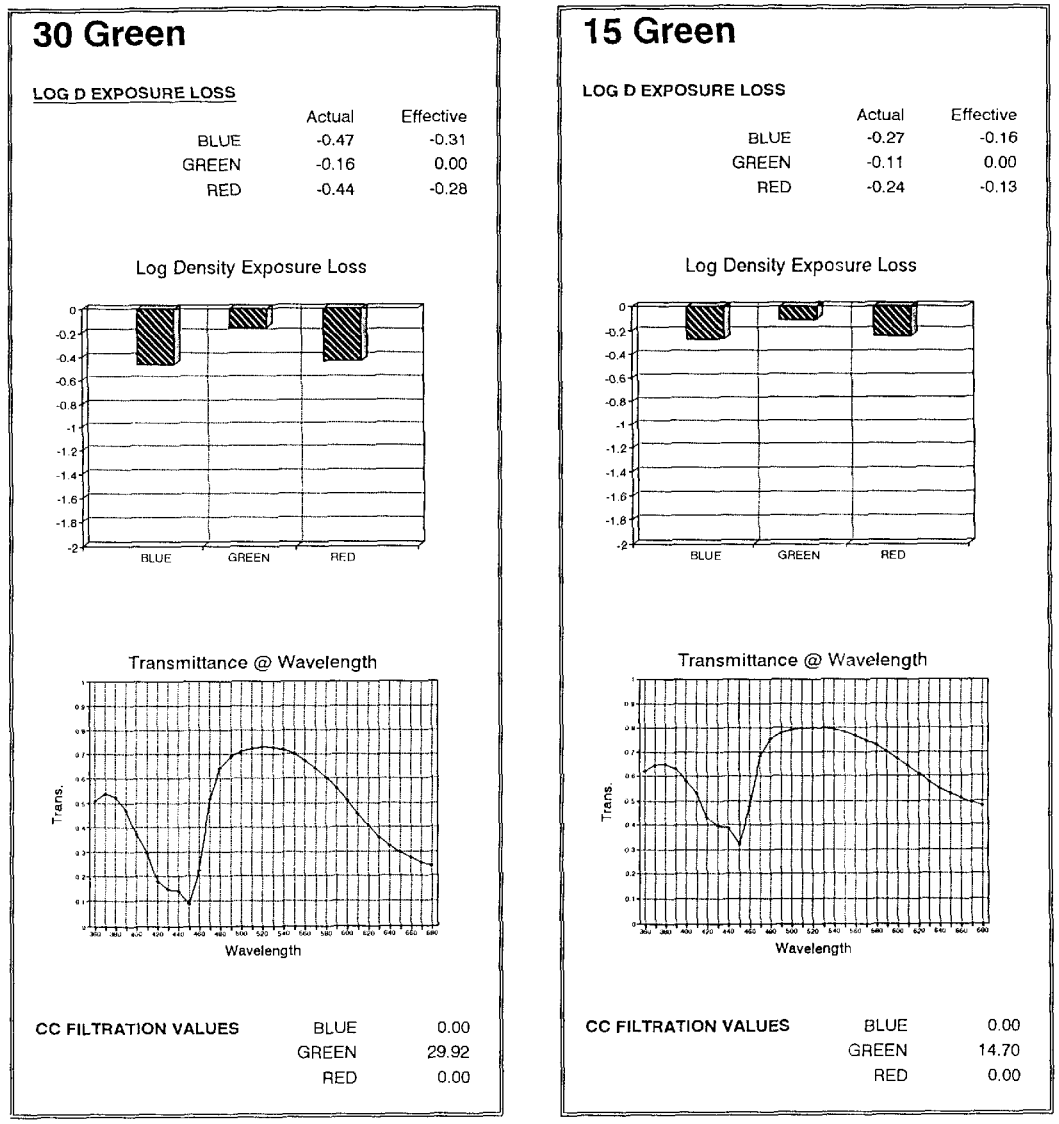
FIG. 4 is a graphic representation of the log density exposure loss and transmittance curves for the green color group lighting filter in accordance with the present invention for effective absorption densities 0.15 (15 green) and 0.30 (30 green).
Figure 5:
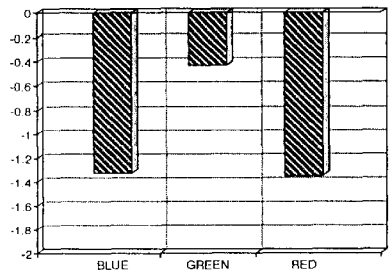
FIG. 5 is a graphic representation of the log density exposure loss and transmittance curves for the green color group lighting filter in accordance with the present invention for effective absorption densities 0.60 (60 green) and 0.90 (90 green).
Figure 5:
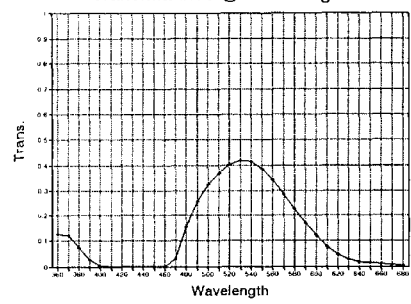
Figure 5:
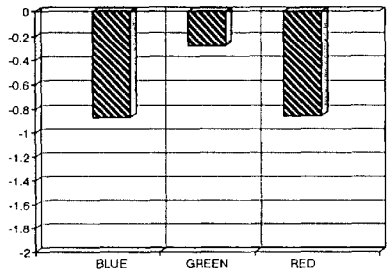
Figure 5:
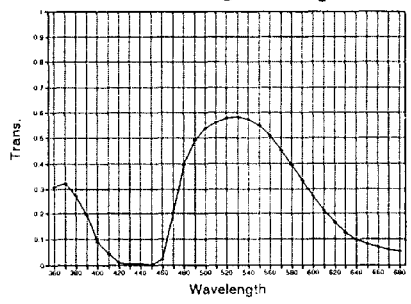
Figure 6:
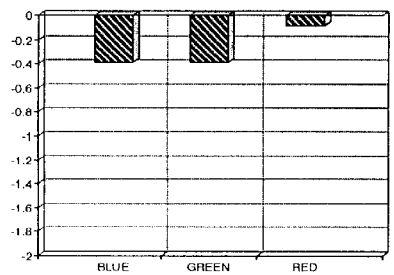
FIG. 6 is a graphic representation of the log density exposure loss and transmittance curves for the red color group lighting filter in accordance with the present invention for effective absorption densities 0.15 (15 red) and 0.30 (30 red).
Figure 6:
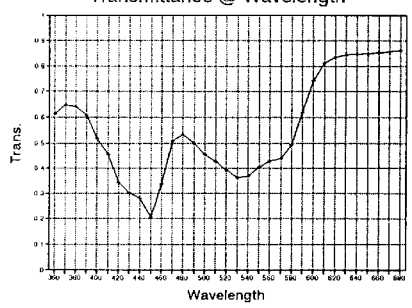
Figure 6:
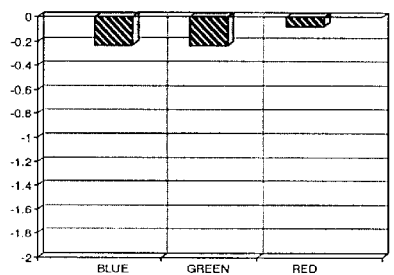
Figure 6:
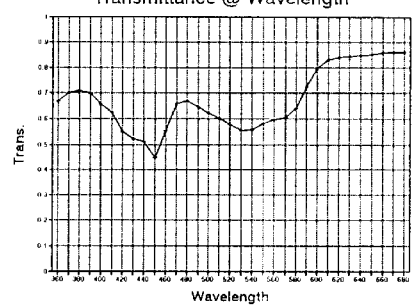
Figure 7:
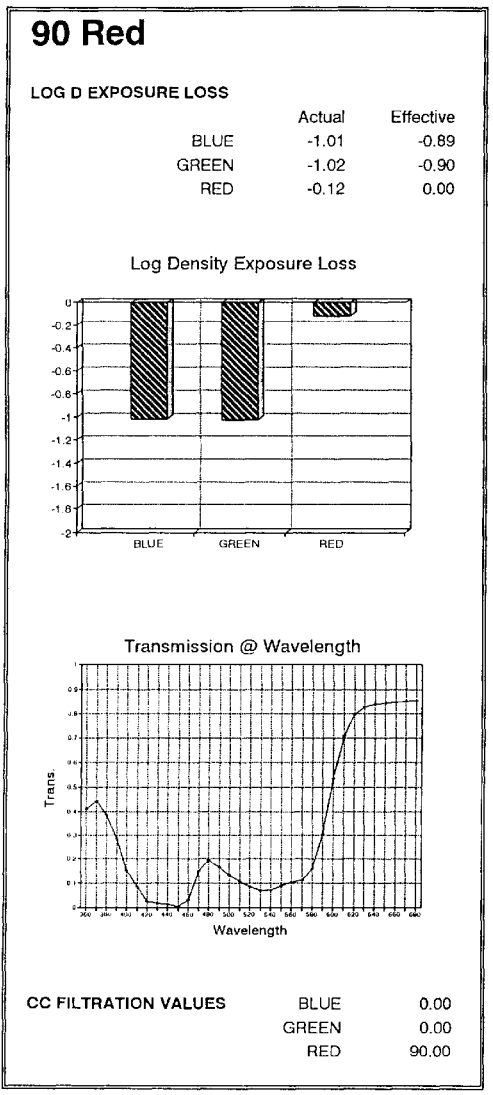
FIG. 7 is a graphic representation of the log density exposure loss and transmittance curves for the red color group lighting filter in accordance with the present invention for effective absorption densities 0.60 (60 red) and 0.90 (90 red).
Figure 7:
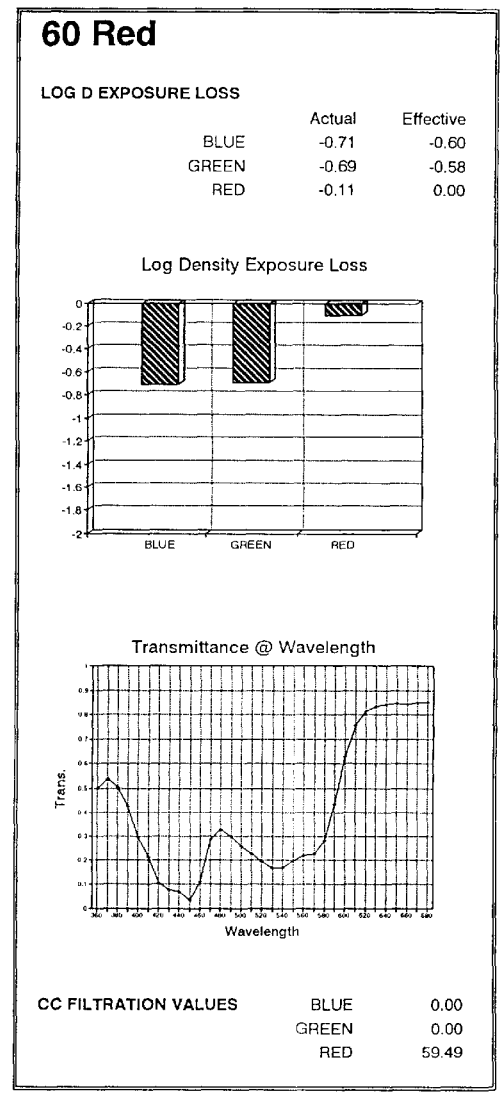
Figure 8:
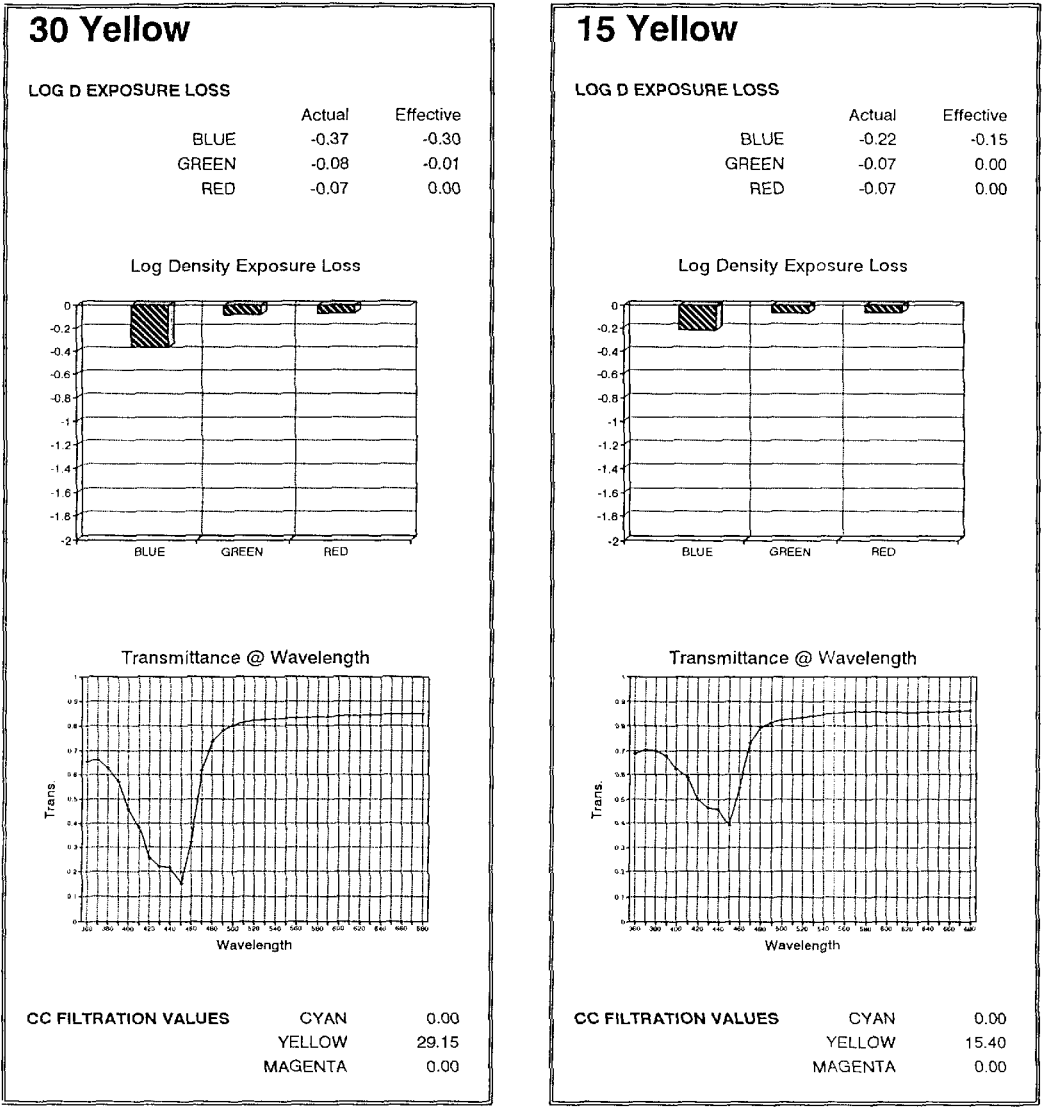
FIG. 8 is a graphic representation of the log density exposure loss and transmittance curves for the yellow color group lighting filter in accordance with the present invention for effective absorption densities 0.15 (15 yellow) and 0.30 (30 yellow).
Figure 9:
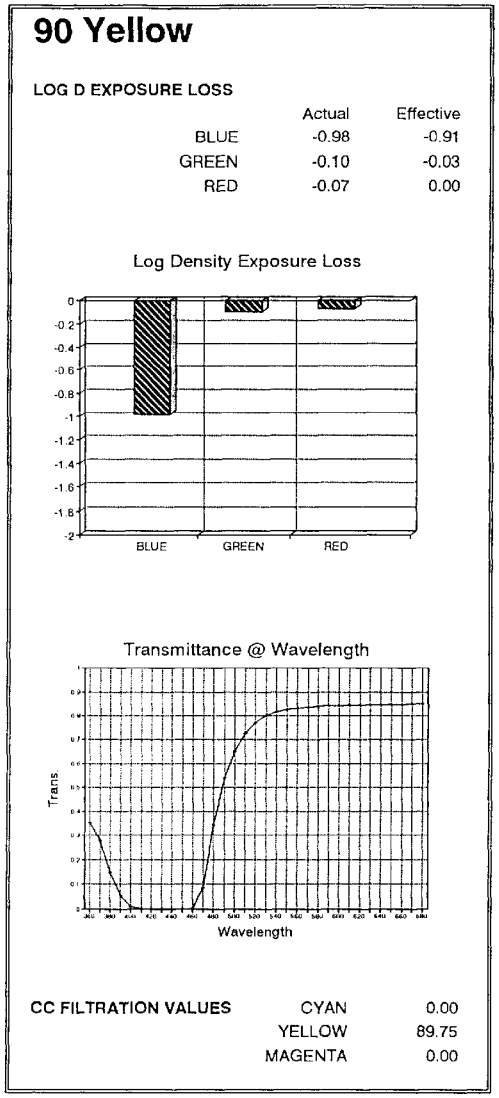
FIG. 9 is a graphic representation of the log density exposure loss and transmittance curves for the yellow color group lighting filter in accordance with the present invention for effective absorption densities 0.60 (60 yellow) and 0.90 (90 yellow).
Figure 9:
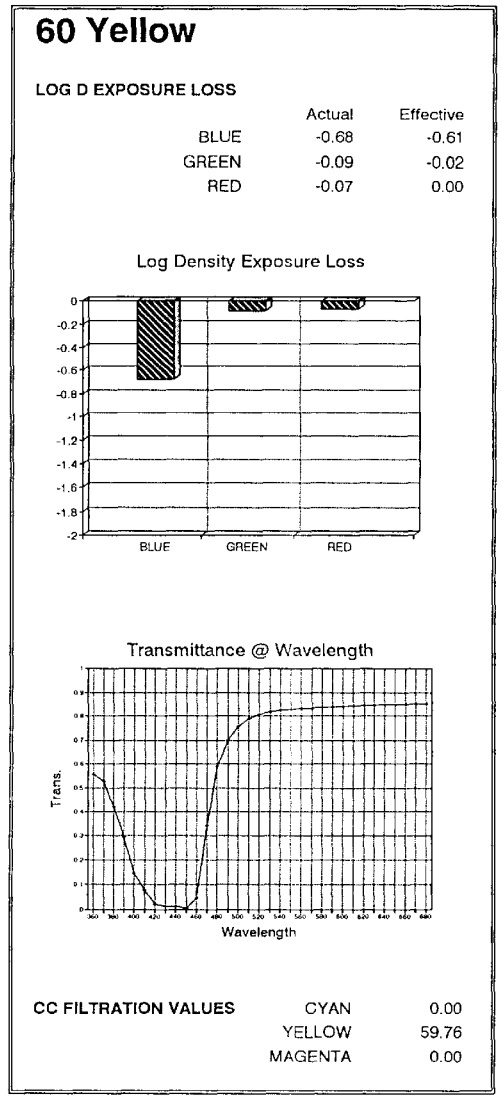
Figure 10:
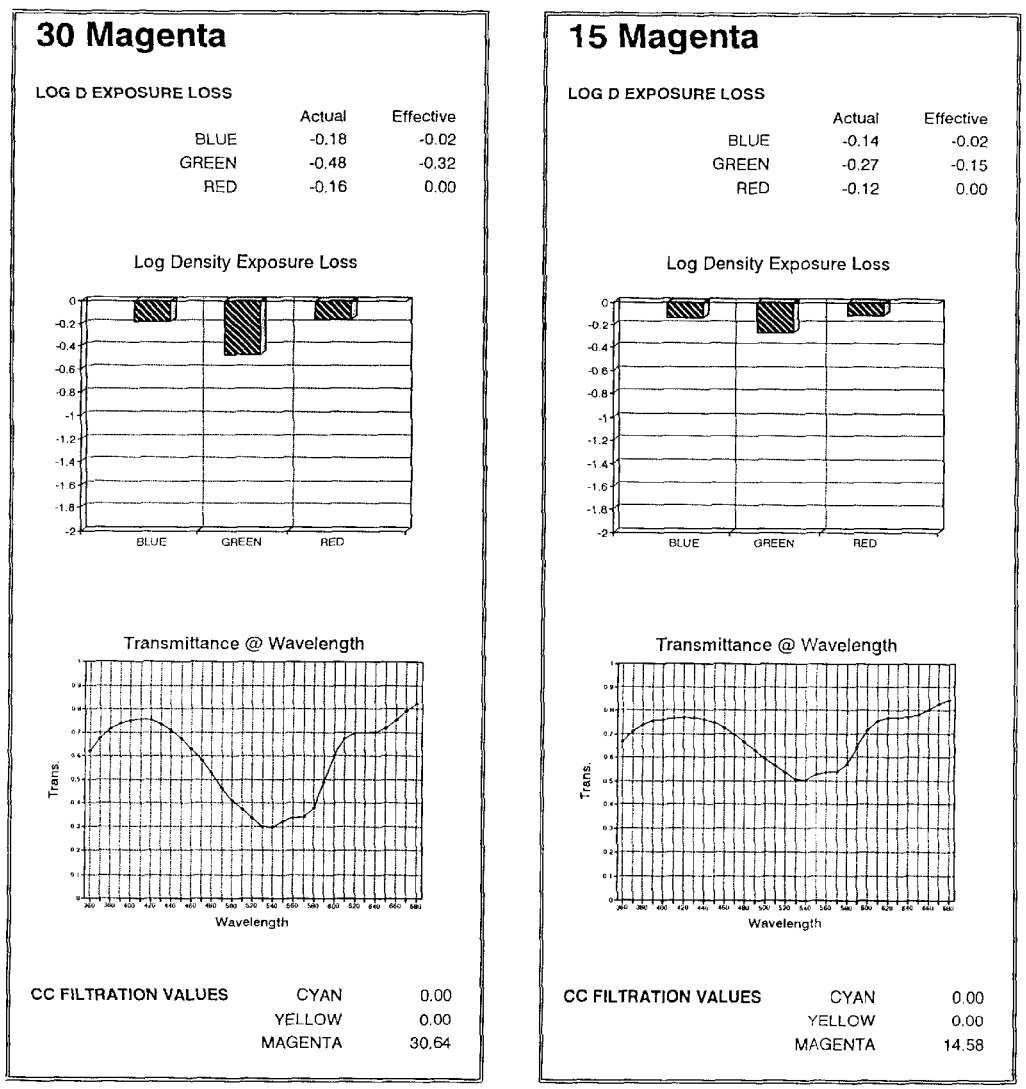
FIG. 10 is a graphic representation of the log density exposure loss and transmittance curves for the magenta color group lighting filter in accordance with the present invention for effective absorption densities 0.15 (15 magenta) and 0.30 (30 magenta).
Figure 11:
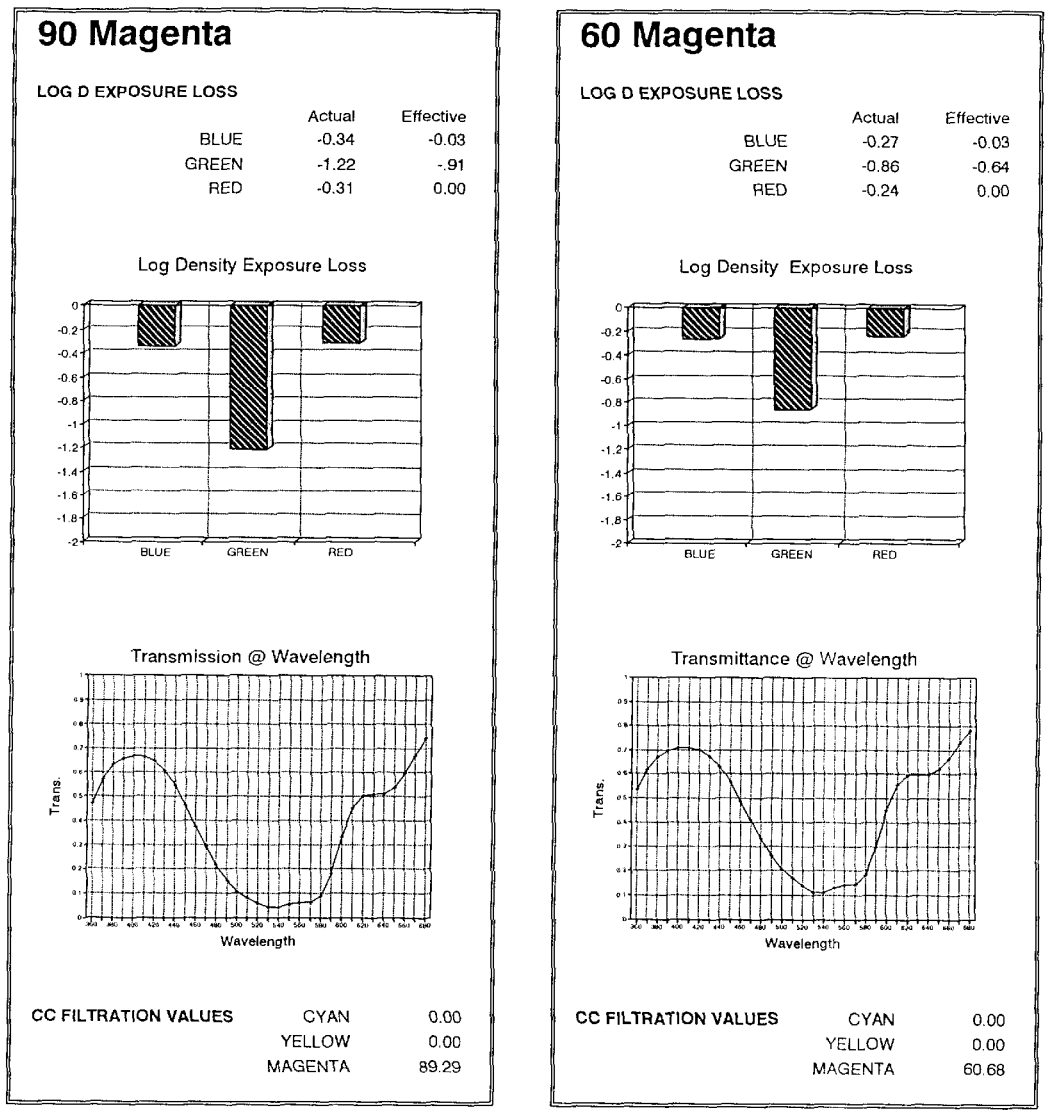
FIG. 11 is a graphic representation of the log density exposure loss and transmittance curves for the magenta color group lighting filter in accordance with the present invention for effective absorption densities 0.60 (60 magenta) and 0.90 (90 magenta).
Figure 12:
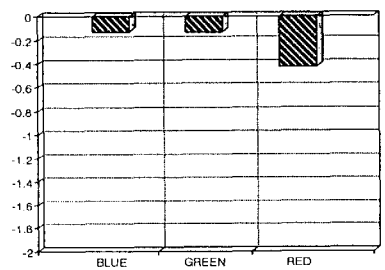
FIG. 12 is a graphic representation of the log density exposure loss and transmittance curves for the cyan color group lighting filter in accordance with the present invention for effective absorption densities 0.15 (15 cyan) and 0.30 (30 cyan).
Figure 12:
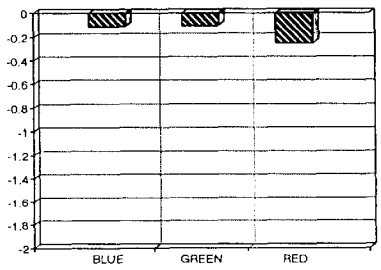
Figure 12:
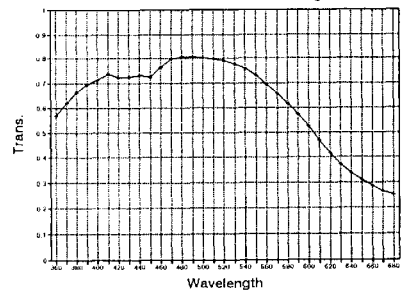
Figure 12:
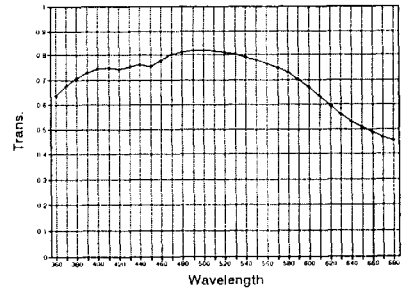
Figure 13:
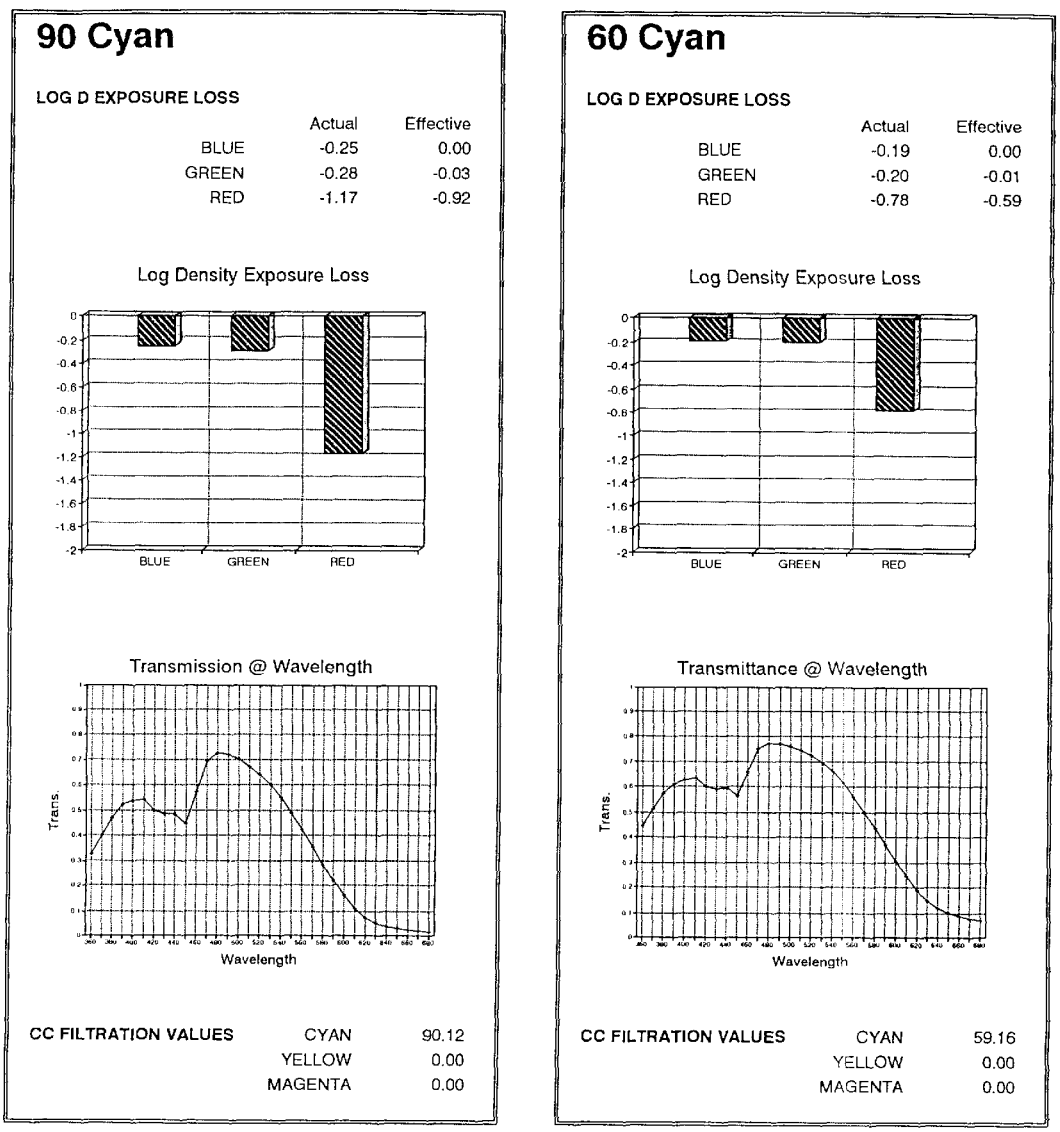
FIG. 13 is a graphic representation of the log density exposure loss and transmittance curves for the cyan color group lighting filter in accordance with the present invention for effective absorption densities 0.60 (60 cyan) and 0.90 (90 cyan).
Figure 14:
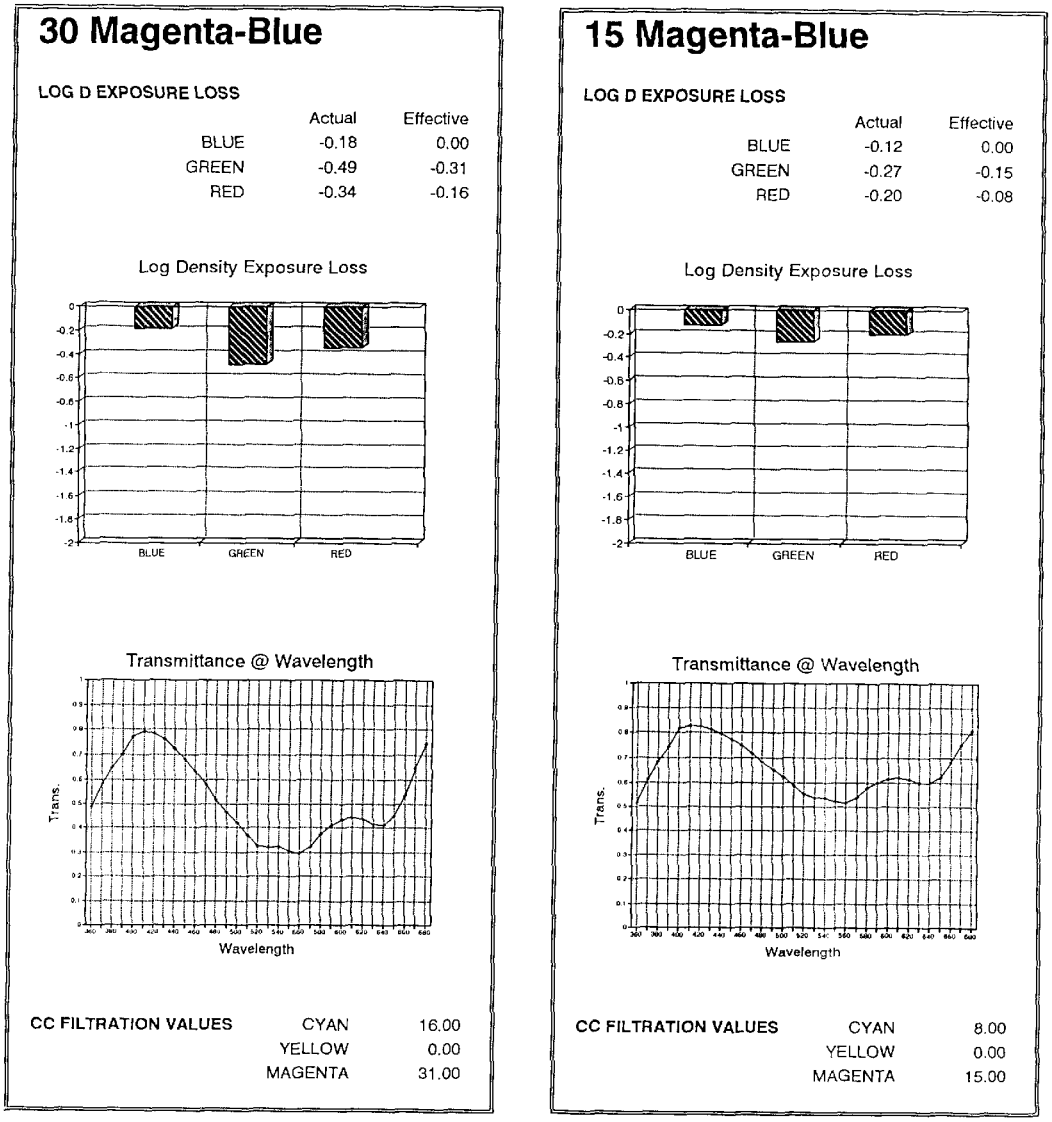
FIG. 14 is a graphic representation of the log density exposure loss and transmittance curves for the magenta-blue color group lighting filter in accordance with the present invention for effective absorption densities 0.15 (15 magenta-blue) and 0.30 (30 magenta-blue).
Figure 15:
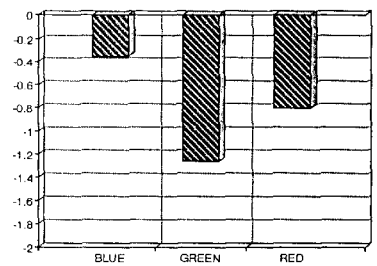
FIG. 15 is a graphic representation of the log density exposure loss and transmittance curves for the magenta-blue color group lighting filter in accordance with the present invention for effective absorption densities 0.60 (60 magenta-blue) and 0.90 (90 magenta-blue).
Figure 15:
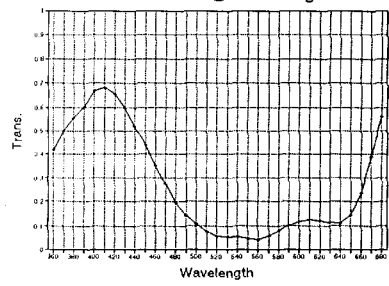
Figure 15:
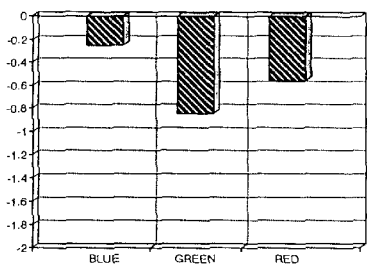
Figure 15:
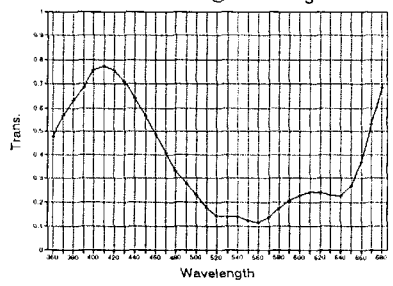
Figure 16:
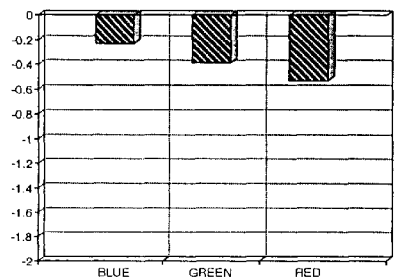
FIG. 16 is a graphic representation of the log density exposure loss and transmittance curves for the cyan-blue color group lighting filter in accordance with the present invention for effective absorption densities 0.15 (15 cyan-blue) and 0.30 (30 cyan-blue).
Figure 16:
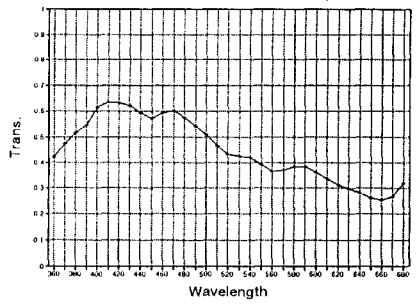
Figure 16:
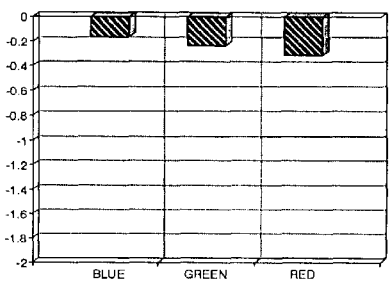
Figure 16:
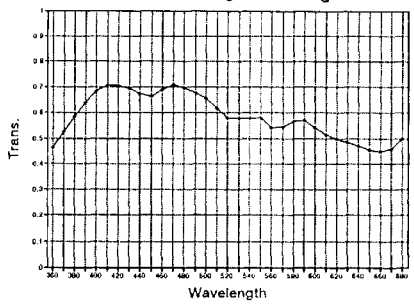
Figure 17:
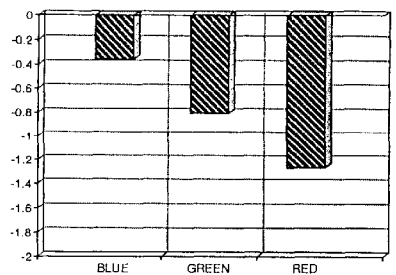
FIG. 17 is a graphic representation of the log density exposure loss and transmittance curves for the cyan-blue color group lighting filter in accordance with the present invention for effective absorption densities 0.60 (60 cyan-blue) and 0.90 (90 cyan-blue).
Figure 17:
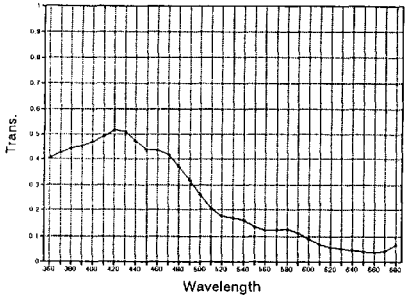
Figure 17:
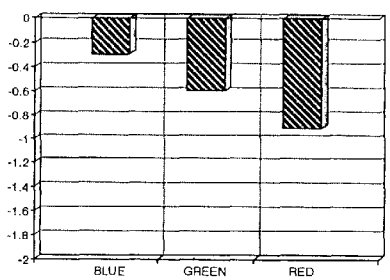
Figure 17:
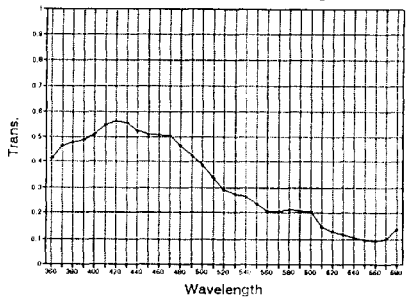
Figure 18:
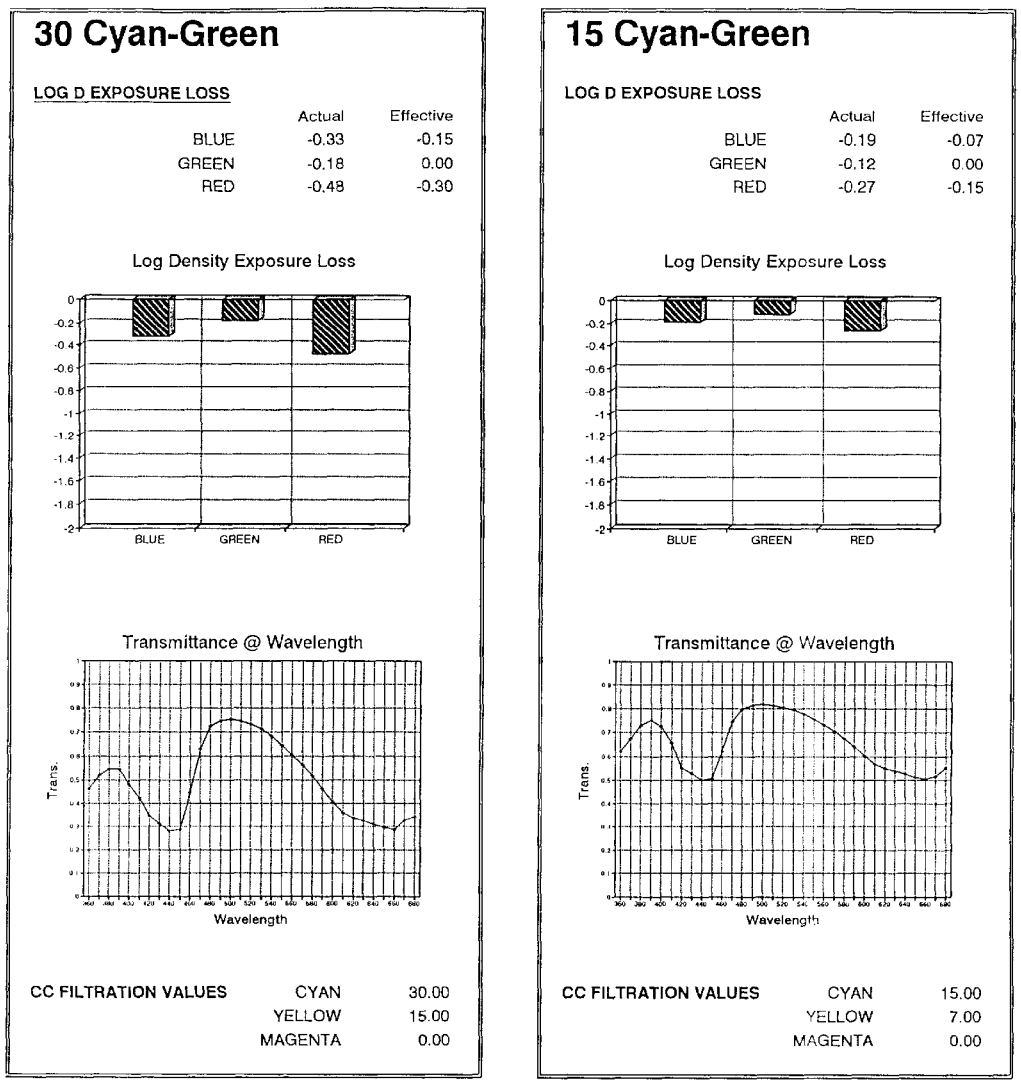
FIG. 18 is a graphic representation of the log density exposure loss and transmittance curves for the cyan-green color group lighting filter in accordance with the present invention for effective absorption densities 0.15 (15 cyan-green) and 0.30 (30 cyan-green).
Figure 19:
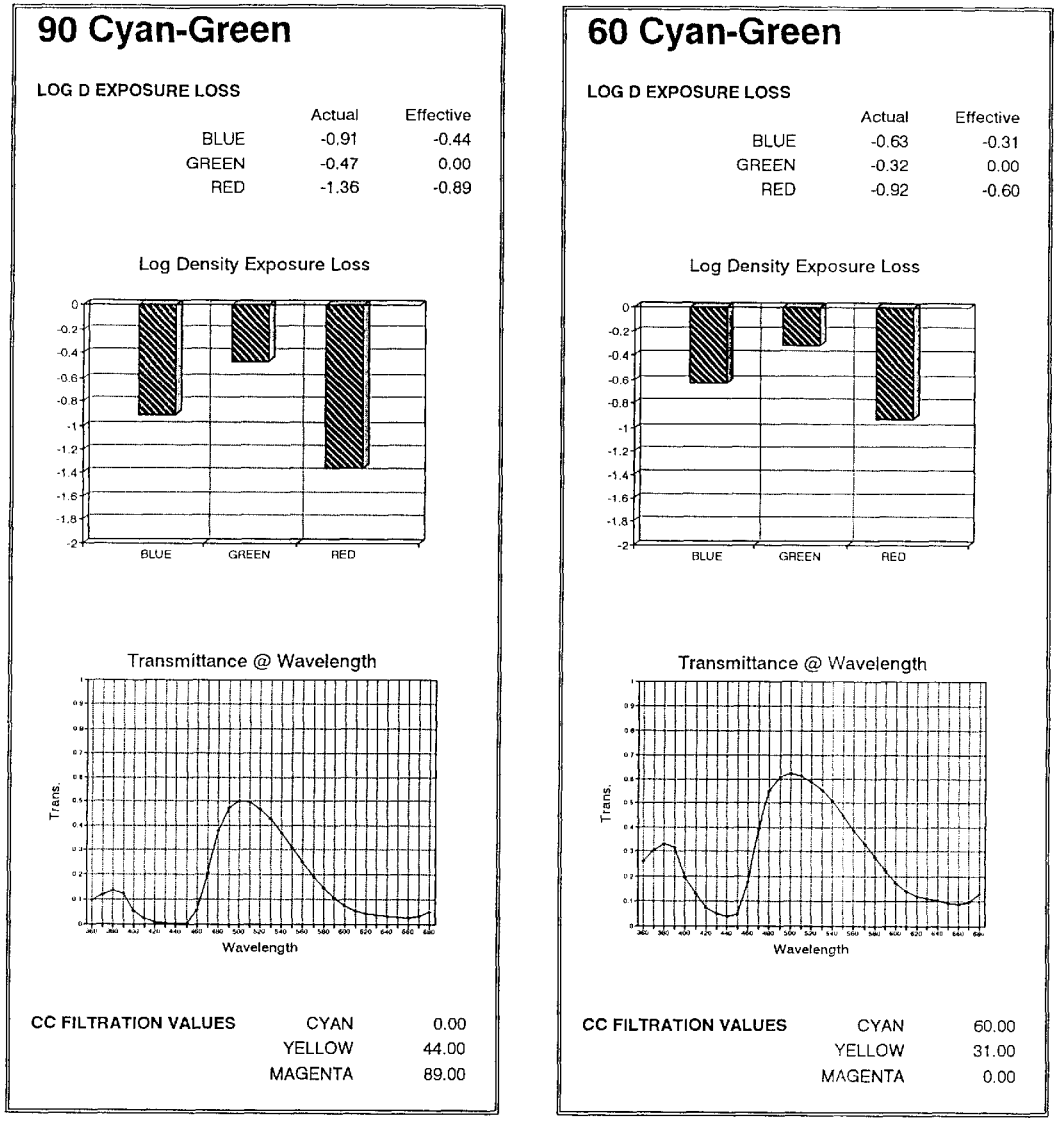
FIG. 19 is a graphic representation of the log density exposure loss and transmittance curves for the cyan-green color group lighting filter in accordance with the present invention for effective absorption densities 0.60 (60 cyan-green) and 0.90 (90 cyan-green).
Figure 20:
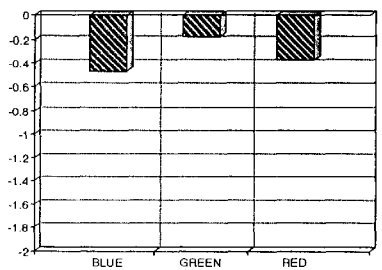
FIG. 20 is a graphic representation of the log density exposure loss and transmittance curves for the yellow-green color group lighting filter in accordance with the present invention for effective absorption densities 0.15 (15 yellow-green) and 0.30 (30 yellow-green).
Figure 20:
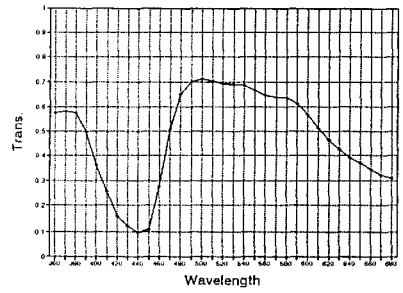
Figure 20:
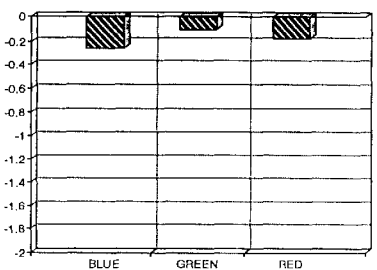
Figure 20:
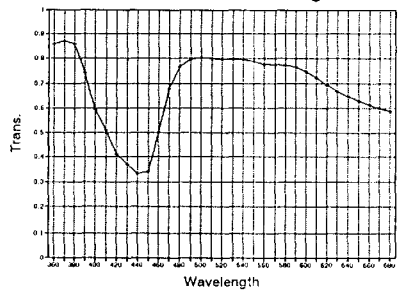
Figure 21:
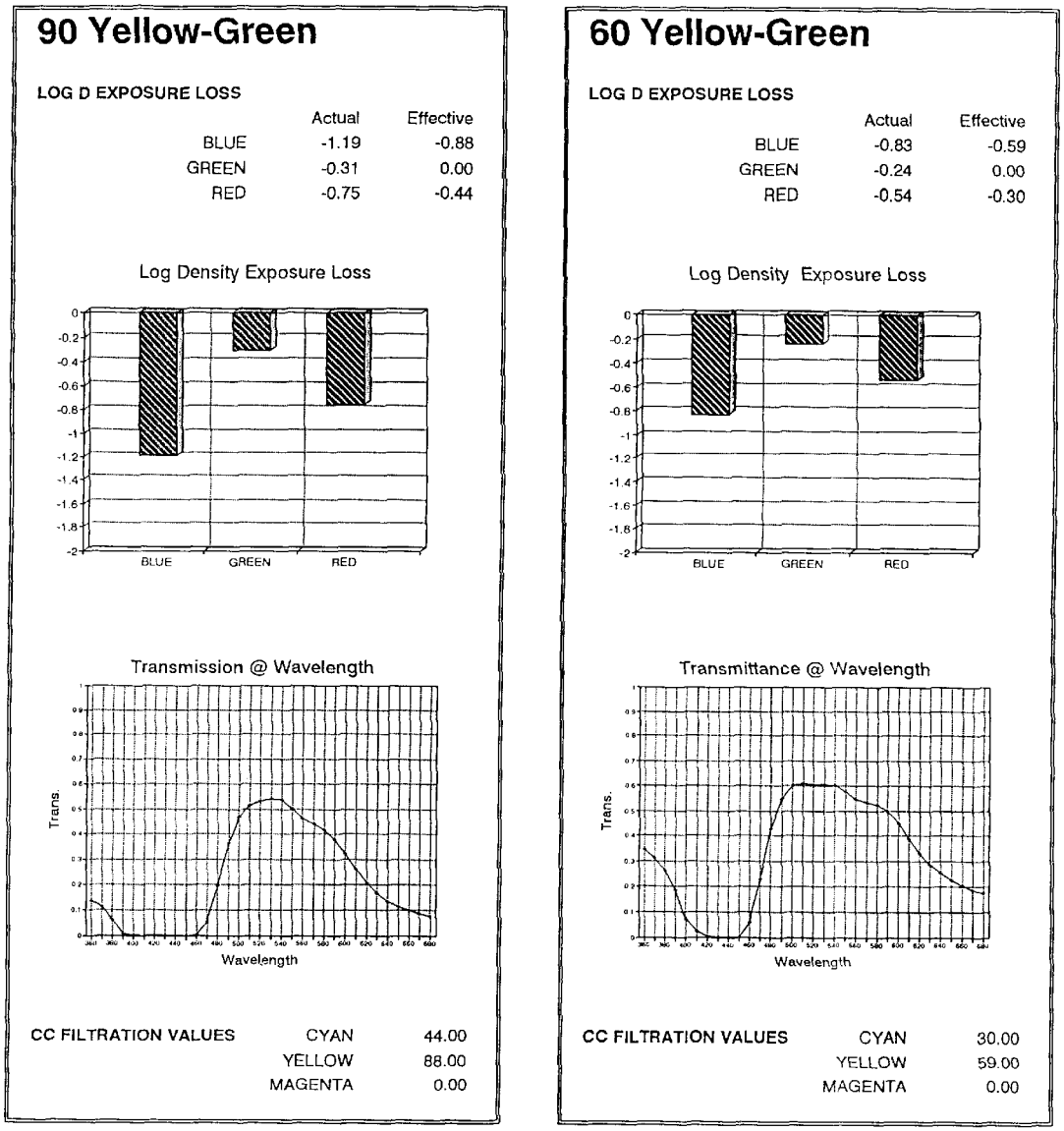
FIG. 21 is a graphic representation of the log density exposure loss and transmittance curves for the yellow-green color group lighting filter in accordance with the present invention for effective absorption densities 0.60 (60 yellow-green) and 0.90 (90 yellow-green).
Figure 22:
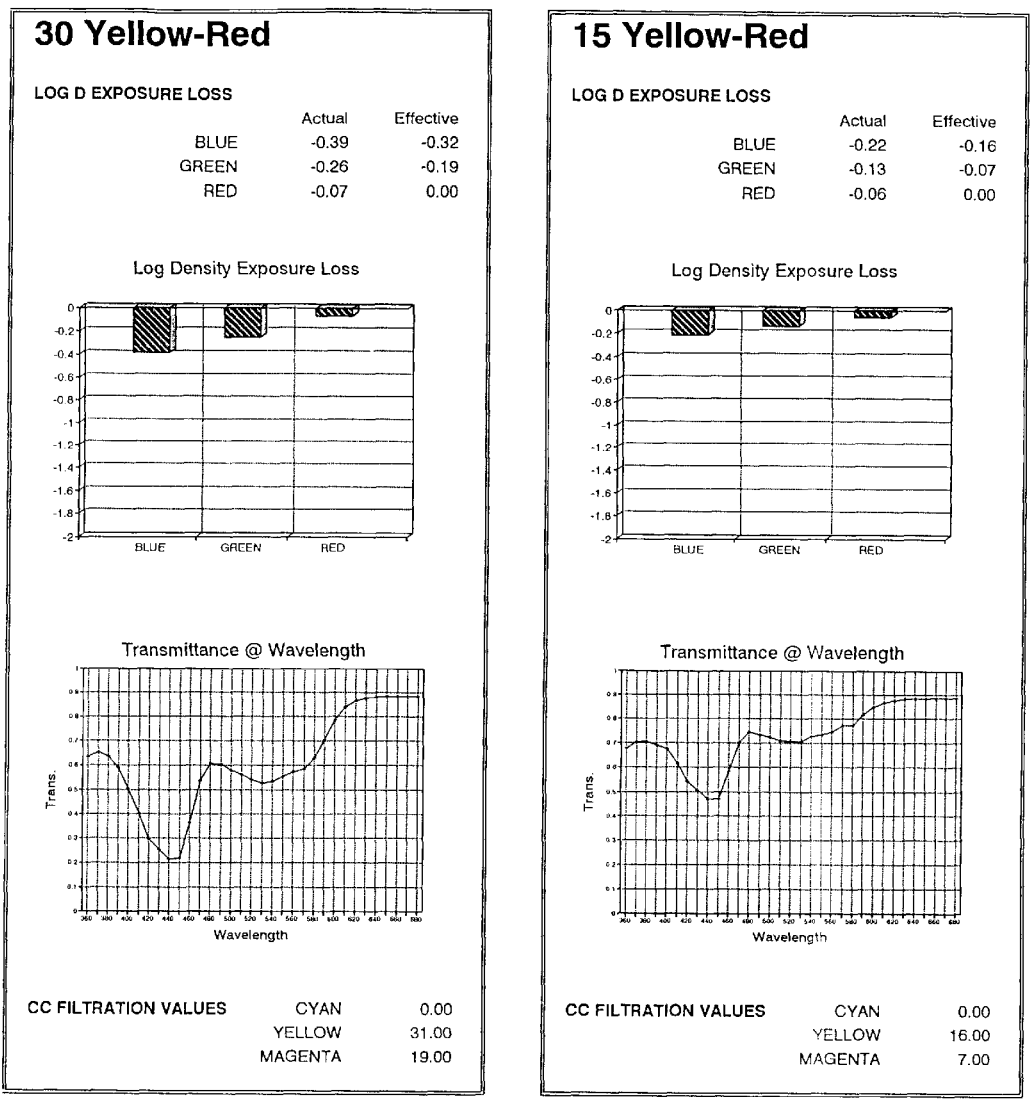
FIG. 22 is a graphic representation of the log density exposure loss and transmittance curves for the yellow-red color group lighting filter in accordance with the present invention for effective absorption densities 0.15 (15 yellow-red) and 0.30 (30 yellow-red).
Figure 23:
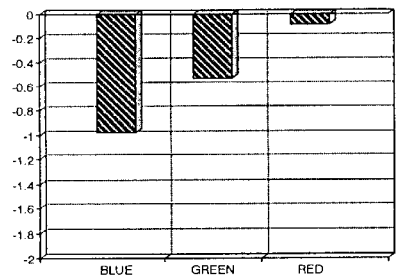
FIG. 23 is a graphic representation of the log density exposure loss and transmittance curves for the yellow-red color group lighting filter in accordance with the present invention for effective absorption densities 0.60 (60 yellow-red) and 0.90 (90 yellow-red).
Figure 23:
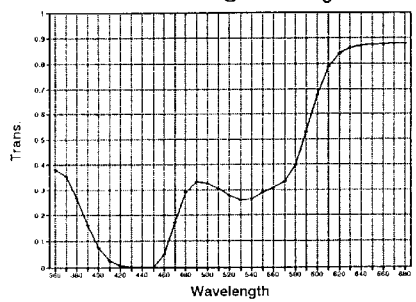
Figure 23:
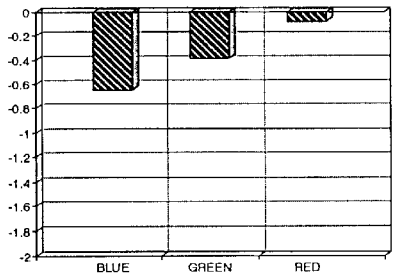
Figure 23:
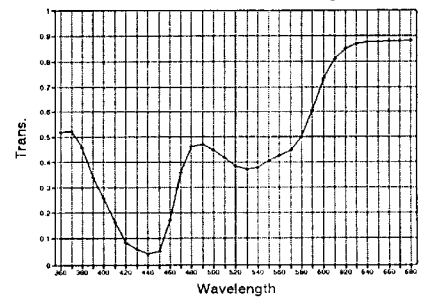
Figure 24:
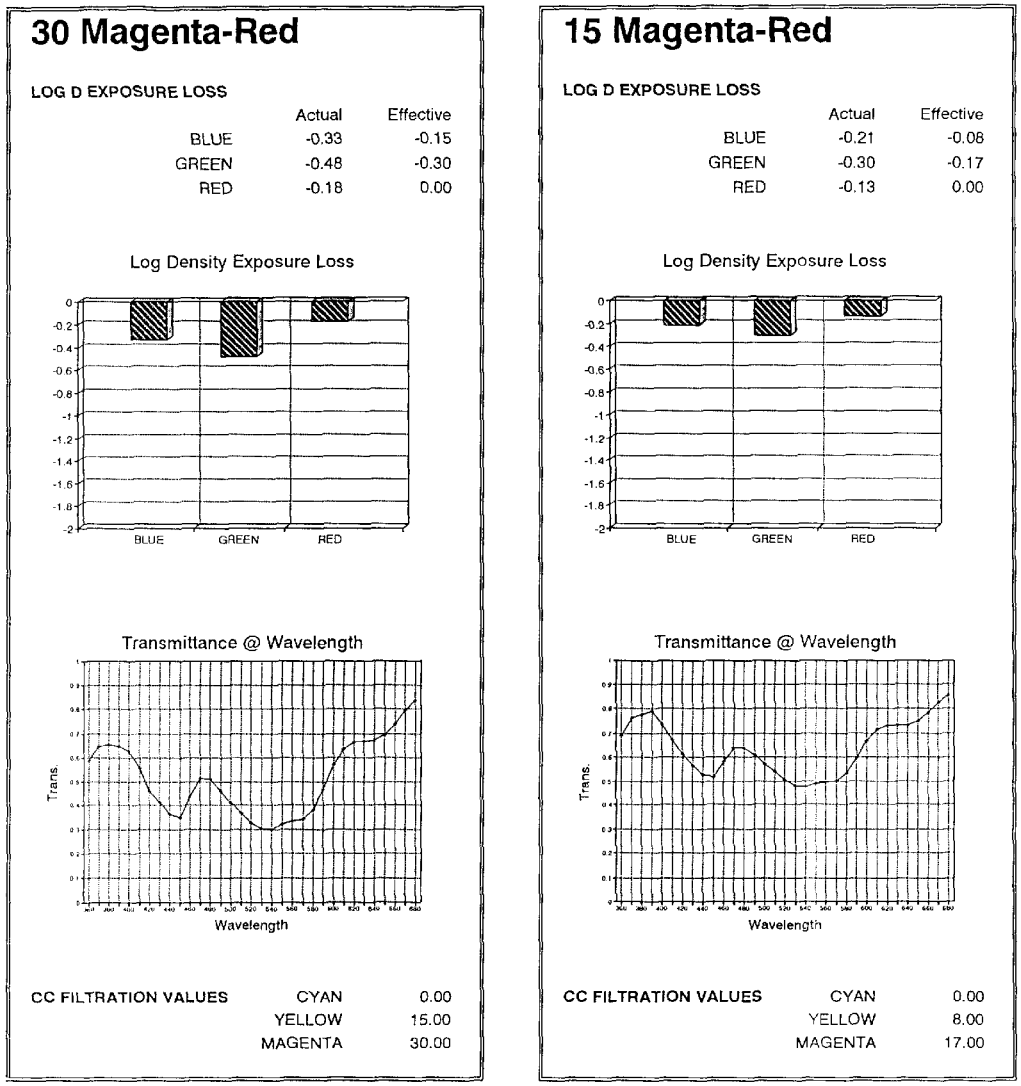
FIG. 24 is a graphic representation of the log density exposure loss and transmittance curves for the magenta-red color group lighting filter in accordance with the present invention for effective absorption densities 0.15 (15 magenta-red) and 0.30 (30 magenta-red).
Figure 25:
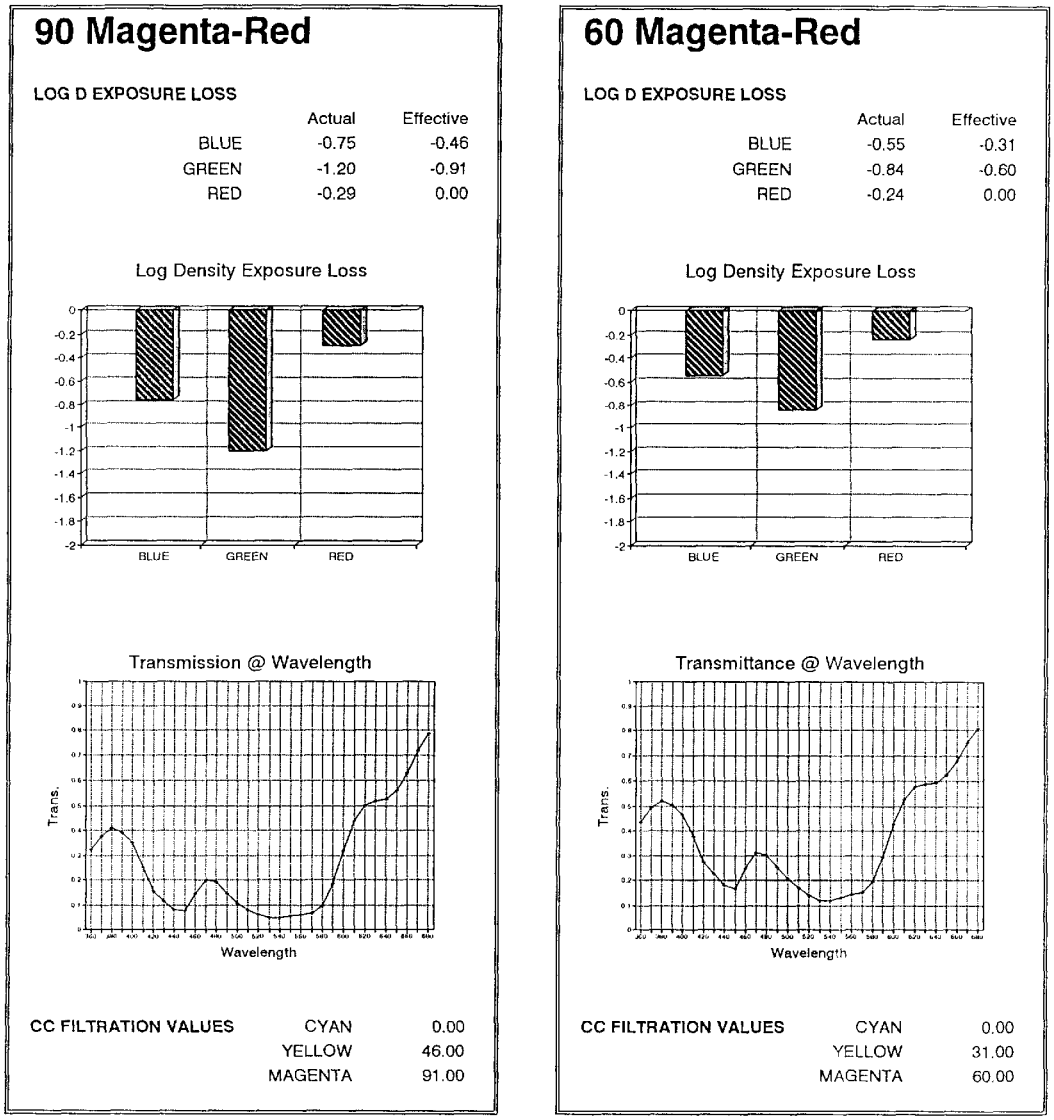
FIG. 25 is a graphic representation of the log density exposure loss and transmittance curves for the magenta-red color group lighting filter in accordance with the present invention for effective absorption densities 0.60 (60 magenta-red) and 0.90 (90 magenta-red).

An exemplary series of filters in accordance with the present invention is set forth in FIGS. 2–13. The filter series includes the three primary color group filters and three secondary color group filters. The filter series set forth in FIGS. 2–13 correspond to the filter series set forth in Tables 1 and 2. Each filter is identified by the number 15, 30, 60 or 90 which corresponds to an effective absorption density of about 0.15, 0.30, 0.60 and 0.90, respectively. The filter series set forth in FIGS. 14–25 correspond to the filter series set forth in Table 3.

The filters whose properties are set forth in FIGS. 2–25 were designed based on the known spectral-sensitivity characteristics of typical color film emulsions. Eastman-Kodak #5298, a 35 mm Color-Negative tungsten-balanced Motion Picture Emulsion, was chosen as a model.

Various commercially-available transmissive organic dyestuffs were then evaluated and blended until individual formulations were achieved that satisfied the design requirements set forth above. These individual dyestuff formulations were then each dispersed in a 750 ml beaker of hot solvent. A 3-inch wide strip of 2 mil. gauge (0.002 inches) oriented polyester film was then immersed in the beaker for 10 to 30 seconds in order to "swell" and impregnate the film with color. This lab-dip procedure replicates an on-line production process whereby the same film, solvent and dyestuffs are employed. In this production process, the oriented polyester film is unwound, pulled in one-pass by a series of rollers through a hot dye-solvent bath, then dried and rewound.

Each individual physical lab-dip sample was then scanned by a UV-Visible spectrophotometer to obtain the actual transmission values at 10 nanometer intervals for the range 360 nm through 680 nm. These values are graphically represented in FIGS. 2–25 as Transmittance @ Wavelength.

If satisfactory to the design requirements, the physical lab-dip sample was then photographically exposed under controlled conditions to Eastman-Kodak #5298 Emulsion. After processing, the film image was then measured with a transmission densitometer to determine the resulting density loss for the blue, green and red spectral-sensitivity areas or emulsion layers. These values are listed and graphically represented in FIGS. 2–25 as Log Density Exposure Loss.

In actual use, the series of filters, such as those set forth in FIGS. 2–25 are provided as a set of filter elements to the cameraman or lighting technician. Sample filter elements may then be selected from the series or set based on their calibrated density values and color transmission and tested to see if they achieve the specifically desired lighting effects. In many cases, the calibrated nature of the filter set is useful in that it allows the cameraman to select specific filters to achieve desired lighting effects without the need for a great deal of trial and error. Once it is established which calibrated filters are suitable for a given scene, then larger corresponding filter elements are used, if necessary, to provide light filtering during the filming.

Having thus described exemplary embodiments of the present invention, it should be noted by those skilled in the art that the disclosures herein are exemplary only and that various other alternations, adaptations and modifications may be made within the scope of the present invention. Accordingly, the present invention is not limited to the specific embodiments as illustrated herein.

What is claimed is:

1. A photographic lighting system comprising:
   a) a first light source; and
   b) a filtered light source comprising:
      a second light source; and
      a lighting filter located in front of said second light source, said lighting filter being selected from a filter system comprising:
         a blue filter group comprising four separate filters wherein each of said separate filters has a uniform density and wherein said filter group consists of a 0.15 density blue filter, a 0.30 density blue filter, a 0.60 density blue filter and a 0.90 density blue filter;
         a green filter group comprising four separate filters wherein each of said separate filters has a uniform density and wherein said filter group consists of a 0.15 density green filter, a 0.30 density green filter, a 0.60 density green filter and a 0.90 density green filter;
         a red filter group comprising four separate filters wherein each of said separate filters has a uniform density and wherein said filter group consists of a 0.15 density red filter, a 0.30 density red filter, a 0.60 density red filter and a 0.90 density red filter; and
      a scene which is illuminated by said first light source and said filtered light source.

2. A photographic lighting system according to claim 1 wherein said filter system further comprises:
   a yellow filter group comprising a 0.15 density yellow filter, a 0.30 density yellow filter, a 0.60 density yellow filter and a 0.90 density yellow filter;
   a magenta filter group comprising a 0.15 density magenta filter, a 0.30 density magenta filter, a 0.60 density magenta filter and a 0.90 density magenta filter; and
   a cyan filter group comprising a 0.15 density cyan filter, a 0.30 density cyan filter, a 0.60 density cyan filter and a 0.90 density cyan filter.

3. A photographic lighting system according to claim 2 wherein said filter system further comprises:
   a cyan-blue filter group comprising a 0.15 density cyan-blue filter, a 0.30 density cyan-blue filter, a 0.60 density cyan-blue filter and a 0.90 density cyan-blue filter;
   a cyan-green filter group comprising a 0.15 density cyan-green filter, a 0.30 density cyan-green filter, a 0.60 density cyan-green filter and a 0.90 density cyan-green filter; and
   a yellow-red filter group comprising a 0.15 density yellow-red filter, a 0.30 density yellow-red filter, a 0.60 density yellow-red filter and a 0.90 density yellow-red filter;
   a yellow-green filter group comprising a 0.15 density yellow-green filter, a 0.30 density yellow-green filter, a 0.60 density yellow-green filter and a 0.90 density yellow-green filter;
   a magenta-red filter group comprising a 0.15 density magenta-red filter, a 0.30 density magenta-red filter, a 0.60 density magenta-red filter and a 0.90 density magenta-red filter; and
   a magenta-blue filter group comprising a 0.15 density magenta-blue filter, a 0.30 density magenta-blue filter, a 0.60 density magenta-blue filter and a 0.90 density magenta-blue filter.

4. A photographic lighting system according to claim 1 wherein said filter light source comprises at least two lighting filters selected from said filter system and wherein said lighting filters are superimposed over each other in front of said second light source.

5. A photographic system for making motion pictures, said system comprising:
   a) a first light source; and
   b) a filtered light source comprising:
      a second light source; and
      a lighting filter located in front of said second light source, said lighting filter being selected from a filter system comprising:
         a blue filter group comprising four separate filters wherein each of said separate filters has a uniform density and wherein said filter group consists of a 0.15 density blue filter, a 0.30 density blue filter, a 0.60 density blue filter and a 0.90 density blue filter;
         a green filter group comprising four separate filters wherein each of said separate filters has a uniform density and wherein said filter group consists of a 0.15 density green filter, a 0.30 density green filter, a 0.60 density green filter and a 0.90 density green filter;
         a red filter group comprising four separate filters wherein each of said separate filters has a uniform density and wherein said filter group consists of a 0.15 density red filter, a 0.30 density red filter, a 0.60 density red filter and a 0.90 density red filter;
      a scene which is illuminated by said first light source and said filtered light source to produce an illuminated scene; and
      a motion picture camera for recording images of said illuminated scene.

6. A photographic system for making motion pictures according to claim 5 wherein said filter system further comprises:
   a yellow filter group comprising a 0.15 density yellow filter, a 0.30 density yellow filter, a 0.60 density yellow filter and a 0.90 density yellow filter;
   a magenta filter group comprising a 0.15 density magenta filter, a 0.30 density magenta filter, a 0.60 density magenta filter and a 0.90 density magenta filter; and
   a cyan filter group comprising a 0.15 density cyan filter, a 0.30 density cyan filter, a 0.60 density cyan filter and a 0.90 density cyan filter.

7. A photographic system for making motion pictures according to claim 6 wherein said filter system further comprises:
   a cyan-blue filter group comprising a 0.15 density cyan-blue filter, a 0.30 density cyan-blue filter, a 0.60 density cyan-blue filter and a 0.90 density cyan-blue filter;
   a cyan-green filter group comprising a 0.15 density cyan-green filter, a 0.30 density cyan-green filter, a 0.60 density cyan-green filter and a 0.90 density cyan-green filter; and a yellow-red filter group comprising a 0.15 density yellow-red filter, a 0.30 density yellow-red filter, a 0.60 density yellow-red filter and a 0.90 density yellow-red filter.

a yellow-green filter group comprising a 0.15 density yellow-green filter, a 0.30 density yellow-green filter, a 0.60 density yellow-green filter and a 0.90 density yellow-green filter;

a magenta-red filter group comprising a 0.15 density magenta-red filter, a 0.30 density magenta-red filter, a 0.60 density magenta-red filter and a 0.90 density magenta-red filter; and a magenta-blue filter group comprising a 0.15 density magenta-blue filter, a 0.30 density magenta-blue filter, a 0.60 density magenta-blue filter and a 0.90 density magenta-blue filter.

8. A photographic system for making motion pictures according to claim 5 wherein said filter light source comprises at least two lighting filters selected from said filter system and wherein said lighting filters are superimposed over each other in front of said second light source.

9. A method of motion picture photography comprising the steps of:

a) providing a first source which emits visible radiation;

b) providing a filtered light source comprising:
   a second light source; and
   a lighting filter located in front of said second light source, said lighting filter being selected from a filter system comprising:
      a blue filter group comprising four separate filters wherein each of said separate filters has a uniform density and wherein said filter group consists of a 0.15 density blue filter, a 0.30 density blue filter, a 0.60 density blue filter and a 0.90 density blue filter;
      a green filter group comprising four separate filters wherein each of said separate filters has a uniform density and wherein said filter group consists of a 0.15 density green filter, a 0.30 density green filter, a 0.60 density green filter and a 0.90 density green filter;
      a red filter group comprising four separate filters wherein each of said separate filters has a uniform density and wherein said filter group consists of a 0.15 density red filter, a 0.30 density red filter, a 0.60 density red filter and a 0.90 density red filter;

illuminating a scene with said first source and said filtered light source to produce an illuminated scene; and recording images of said illuminated scene.

10. A method of motion picture photography according to claim 9 wherein said filter system further comprises:

a yellow filter group comprising a 0.15 density yellow filter, a 0.30 density yellow filter, a 0.60 density yellow filter and a 0.90 density yellow filter;

a magenta filter group comprising a 0.15 density magenta filter, a 0.30 density magenta filter, a 0.60 density magenta filter and a 0.90 density magenta filter; and a cyan filter group comprising a 0.15 density cyan filter, a 0.30 density cyan filter, a 0.60 density cyan filter and a 0.90 density cyan filter.

11. A method of motion picture photography according to claim 9 wherein said filter system further comprises:

a cyan-blue filter group comprising a 0.15 density cyan-blue filter, a 0.30 density cyan-blue filter, a 0.60 density cyan-blue filter and a 0.90 density cyan-blue filter;

a cyan-green filter group comprising a 0.15 density cyan-green filter, a 0.30 density cyan-green filter, a 0.60 density cyan-green filter and a 0.90 density cyan-green filter; and a yellow-red filter group comprising a 0.15 density yellow-red filter, a 0.30 density yellow-red filter, a 0.60 density yellow-red filter and a 0.90 density yellow-red filter;

a yellow-green filter group comprising a 0.15 density yellow-green filter, a 0.30 density yellow-green filter, a 0.60 density yellow-green filter and a 0.90 density yellow-green filter;

a magenta-red filter group comprising a 0.15 density magenta-red filter, a 0.30 density magenta-red filter, a 0.60 density magenta-red filter and a 0.90 density magenta-red filter; and a magenta-blue filter group comprising a 0.15 density magenta-blue filter, a 0.30 density magenta-blue filter, a 0.60 density magenta-blue filter and a 0.90 density magenta-blue filter.

12. A method of motion picture photography according to claim 9 wherein said filter light source comprises at least two lighting filters selected from said filter system and wherein said lighting filters are superimposed over each other in front of said second light source.

* * * * *